(12) United States Patent
Heckmeier et al.

(10) Patent No.: US 7,033,654 B2
(45) Date of Patent: *Apr. 25, 2006

(54) LIQUID-CRYSTALLINE MEDIUM

(75) Inventors: Michael Heckmeier, Bensheim (DE); Brigitte Schuler, Haibach (DE); Kazuaki Tarumi, Seeheim (DE); Peer Kirsch, Darmstadt (DE); Volker Reiffenrath, Rossdorf (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/882,309

(22) Filed: Jul. 2, 2004

(65) Prior Publication Data

US 2005/0035329 A1   Feb. 17, 2005

Related U.S. Application Data

(62) Division of application No. 09/868,866, filed as application No. PCT/EP99/09919 on Dec. 14, 1999, now Pat. No. 6,793,983.

(30) Foreign Application Priority Data

Dec. 22, 1998  (DE) ................. 198 59 421

(51) Int. Cl.
  *C09K 19/30*  (2006.01)
  *C09K 19/34*  (2006.01)
  *C09K 19/12*  (2006.01)
  *C09K 19/20*  (2006.01)

(52) U.S. Cl. ............. 428/1.1; 252/299.61; 252/299.63; 252/299.66; 252/299.67

(58) Field of Classification Search ................ 428/1.1; 252/299.61, 299.63, 299.66, 299.67
See application file for complete search history.

(56) References Cited

U.S. PATENT DOCUMENTS

| 5,209,868 | A | 5/1993 | Reiffenrath et al. |
| 5,328,642 | A | 7/1994 | Rieger et al. |
| 5,368,772 | A | 11/1994 | Rieger et al. |
| 5,643,495 | A | 7/1997 | Bartmann et al. |
| 5,723,682 | A | 3/1998 | Poetsch et al. |
| 5,868,962 | A | 2/1999 | Rieger et al. |
| 5,919,396 | A | 7/1999 | Tarumi et al. |
| 6,080,452 | A | 6/2000 | Tarumi et al. |
| 6,287,648 | B1 | 9/2001 | Tarumi et al. |
| 6,465,059 | B1 * | 10/2002 | Bremer et al. ................. 428/1.1 |
| 6,780,477 | B1 * | 8/2004 | Kirsch et al. ................. 428/1.1 |
| 6,793,983 | B1 * | 9/2004 | Heckmeier et al. ........... 428/1.1 |

FOREIGN PATENT DOCUMENTS

| DE | 4023107 | 1/1992 |
| DE | 4123389 | 1/1993 |
| DE | 4308028 | 9/1994 |
| DE | 19707154 | 9/1997 |
| WO | WO 90/12073 | 10/1990 |
| WO | WO 91/19772 | 12/1991 |
| WO | WO 92/02597 | 2/1992 |
| WO | WO 92/06148 | 4/1992 |

* cited by examiner

*Primary Examiner*—Shean C. Wu
(74) *Attorney, Agent, or Firm*—Millen, White, Zelano, Branigan, P.C.

(57) ABSTRACT

A liquid-crystalline medium based on a mixture of polar compounds of positive dielectric anisotropy, which medium exhibits a birefringence value of $\leq 0.065$ and includes one or more compounds of formula Ia

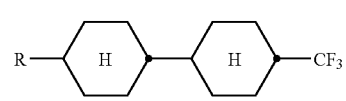

and at least one compound of the formula Xc or Xd:

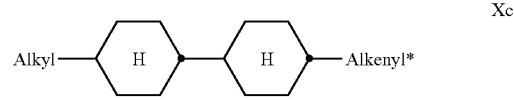

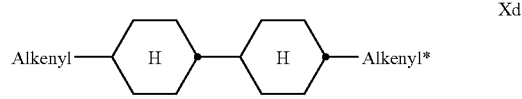

in which R, alkyl, alkenyl and alkenyl* are as defined in claim 1.

16 Claims, No Drawings

LIQUID-CRYSTALLINE MEDIUM

This application is a divisional of U.S. Ser. No. 09/868,886, filed Jun. 21, 2001, which is a 371 National Phase application of PCT/EP99/09919, filed Dec. 14, 1999.

The present invention relates to a liquid-crystalline medium, and to the use thereof for electro-optical purposes, and to displays containing this medium.

Liquid-crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, in the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, must satisfy various requirements depending on the cell type and area of application. For example, materials for cells having a twisted nematic structure should have positive dielectric anisotropy and low electrical conductivity.

For example, media having large positive dielectric anisotropy, broad nematic phases, relatively low birefringence, very high specific resistance, good UV and temperature stability and low vapour pressure are desired for matrix liquid-crystal displays containing integrated non-linear elements for switching individual pixels (MLC displays).

Matrix liquid-crystal displays of this type are known. Non-linear elements which can be used for individual switching of the individual pixels are, for example, active elements (i.e. transistors). Reference is then made to an "active matrix", where a distinction can be made between two types:
1. MOS (metal oxide semiconductor) or other diodes on a silicon wafer as substrate.
2. Thin-film transistors (TFTs) on a glass plate as substrate.

The use of monocrystalline silicon as substrate material restricts the display size, since even modular assembly of various part-displays results in problems at the joints.

In the case of more-promising type 2, which is preferred, the electro-optical effect used is usually the TN effect. A distinction is made between two technologies: TFTs comprising compound semiconductors, such as, for example, CdSe or TFTs based on polycrystalline or amorphous silicon. The latter technology is being worked on intensively worldwide.

The TFT matrix is applied to the inside of one glass plate of the display, while the other glass plate carries the transparent counterelectrode on its inside. In contrast to the size of the pixel electrode, the TFT is very small and has virtually no interfering effect on the image. This technology can also be expanded to fully colour-compatible displays, in which a mosaic of red, green and blue filters is arranged in such a way that a filter element is opposite each switchable pixel.

The TFT displays usually operate as TN cells with crossed polarizers in transmission and are illuminated from the back.

The term MLC displays here covers any matrix display containing integrated non-linear elements, i.e., besides the active matrix, also displays containing passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to the insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SCHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of a MLC display worsens, and the problem of after-image elimination can occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures of the prior art are also particularly disadvantageous. The demands are that no crystallization and/or smectic phases occur, even at low temperatures, and the temperature dependence of the viscosity is as low as possible. The MLC displays from the prior art thus do not meet today's requirements.

Besides liquid-crystal displays which use back illumination, i.e. are operative transmissively and optionally transflectively, there is also particular interest in reflective liquid-crystal displays. These reflective liquid-crystal displays use the ambient light for information display. They thus consume significantly less energy than back-illuminated liquid-crystal displays of corresponding size and resolution. Since the TN effect is characterized by very good contrast, reflective displays of this type are readily legible even under bright ambient conditions. This is already known of simple reflective TN displays, as used, for example, in wristwatches and pocket calculators. However, the principle can also be applied to high-quality, higher-resolution active matrix-addressed displays, such as, for example, TFT displays. Here, as is already the case in the generally conventional transmissive TFT-TN displays, the use of liquid crystals of low birefringence (Δn) is necessary in order to achieve low optical retardation (d·Δn). This low optical retardation results in a low viewing-angle dependence of the contrast, which is usually acceptable (cf. DE 30 22 818). In reflective displays, the use of liquid crystals of low birefringence is much more important than in transmissive displays, since in reflective displays, the effective layer thickness, through which the light passes, is approximately twice as large as in transmissive displays of the same layer thickness.

Besides the lower power consumption (no back-illumination necessary), other advantages of reflective displays over transmissive displays are the space saving, which results in a very low installation depth, and the reduction in problems caused by temperature gradients due to various heating by the back-illumination.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:
  expanded nematic phase range (in particular down to low temperatures)
  switching at extremely low temperatures (outdoor use, automobile, avionics)
  increased resistance to UV radiation (longer life)
  lower threshold (addressing) voltage
  low birefringence, especially for improved viewing-angle range.

The media available from the prior art do not allow these advantages to be achieved while simultaneously achieving the other parameters.

In the case of supertwisted (STN) cells, media are desired which enable greater multiplexability and/or lower threshold voltages and/or broader nematic phase ranges (in particular at low temperatures). To this end, a further increase in the available parameter latitude (clearing point, smectic-nematic transition or melting point, viscosity, dielectric parameters, elastic parameters) is urgently desired.

The invention has the object of providing media for these MLC, TN or STN displays, in particular for reflective MLC displays, which do not have the abovementioned disadvantages or only do so to a reduced extent, and preferably simultaneously have very high specific resistance values and low threshold voltages and low birefringence values.

It has now been found that this object can be achieved if media according to the invention are used in displays.

The invention thus relates to a liquid-crystalline medium based on a mixture of polar compounds of positive dielectric anisotropy, characterized in that it comprises one or more compounds of general formula I

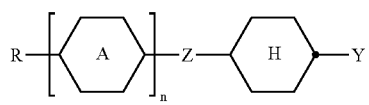

in which
R is H, an alkyl or alkenyl radical having 1 to 15 carbon atoms which is unsubstituted, monosubstituted by CN or $CF_3$ or at least monosubstituted by halogen, where one or more $CH_2$ groups in these radicals may also, in each case independently of one another, be replaced by —O—, —S—,

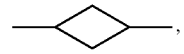

—CO—, —CO—O—, —O—CO— or —O—CO—O— in such a way that O atoms are not linked directly to one another,

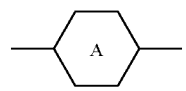

is a trans-1,4-cyclohexylene ring, in which, in addition, one or two $CH_2$ groups may be replaced by —O— and/or —S—, or a cyclohexenylene ring,
Y is halogenated alkyl, halogenated alkenyl, halogenated alkoxy or halogenated alkenyloxy having up to 6 carbon atoms,
Z is —$CH_2$O—, —O$CH_2$—, —$CH_2CH_2$—; —CH=CH—, —$CF_2$O—, —O$CF_2$—, —COO—, —$C_2F_4$— or a single bond, and
n is 1 or 2.

The compounds of the formula I have a broad range of applications. Depending on the choice of substituents, these compounds can serve as base materials of which liquid-crystalline media are predominantly composed; however, it is also possible to add compounds of the formula I to liquid-crystalline base materials from other classes of compound in order, for example, to modify the dielectric and/or, in particular, the optical anisotropy of a dielectric of this type and/or to optimize its threshold voltage and/or its viscosity.

In the pure state, the compounds of the formula I are colourless and form liquid-crystalline mesophases in a temperature range which is favourably located for electro-optical use. They are stable chemically, thermally and to light.

In the media according to the invention comprising compounds of the formula I, Y is preferably $OCF_3$, $OCHF_2$, $CF_3$, $CHFCF_3$, $CF_2CHF_2$, $CF_2Cl$, $OCF_2Cl$, $C_2H_4CHF_2$, $CF_2CHFCF_3$, $CF_2CH_2CF_3$, $CHF_2$, $OCH_2CHF_3$, $OCH_2CHF_2$, $OCF_2CHF_2$, $O(CH_2)_3CF_3$, $OCH_2C_2F_5$, $OCH_2CF_2CHF_2$, $OCH_2C_3F_7$, $OCHFCF_3$, $OC_2F_5$, $OCF_2CHFCF_3$, OCH=$CF_2$, OCF=$CF_2$, OCF=$CFCF_3$, OCF=CF—$C_2F_5$, CH=CHF, CH=$CF_2$, CF=$CF_2$, $CF_2OCF_3$, in particular $OCF_3$ and $CF_3$.

Particular preference is given to compounds of the formula I in which ring A is a trans-1,4-cyclohexane ring or a dioxane ring.

If R is an alkyl radical and/or an alkoxy radical, this can be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If R is an alkyl radical in which one CH$_2$ group has been replaced by —CH=CH—, this can be straight-chain or branched. It is preferably straight-chain and has 2 to 10 carbon atoms. Accordingly, it is in particular vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If R is an alkyl radical in which one CH$_2$ group has been replaced by —O— and one has been replaced by —CO—, these are preferably adjacent. These thus contain an acyloxy group —CO—O— or an oxycarbonyl group —O—CO—.

These are preferably straight-chain and have 2 to 6 carbon atoms.

They are accordingly in particular acetoxy, propionyloxy, butyryloxy, pentanoyloxy, hexanoyloxy, acetoxy-methyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxy-propyl, 4-acetoxybutyl, methoxycarbonyl, ethoxy-carbonyl, propoxycarbonyl, butoxycarbonyl, pentoxy-carbonyl, methoxycarbonylmethyl, ethoxycarbonylmethyl, propoxycarbonylmethyl, butoxycarbonylmethyl, 2-(methoxycarbonyl) ethyl, 2-(ethoxycarbonyl)ethyl, 2-(propoxy-carbonyl)ethyl, 3-(methoxycarbonyl)propyl, 3-(ethoxy-carbonyl)propyl or 4-(methoxycarbonyl)butyl.

If R is an alkyl radical in which one CH$_2$ group has been replaced by unsubstituted or substituted —CH=CH— and an adjacent CH$_2$ group has been replaced by CO or CO—O or O—CO, this can be straight-chain or branched. It is preferably straight-chain and has 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxy-hexyl, 7-acryloyloxyheptyl, 8-acryloyloxyoctyl, 9-acryloyloxynonyl, 10-acryloyloxydecyl, methacryloyl-oxymethyl, 2-methacryloyloxyethyl, 3-methacryloyl-oxypropyl, 4-methacryloyloxybutyl, 5-methacryloyloxy-pentyl, 6-methacryloyloxyhexyl 7-methacryloyloxyheptyl, 8-methacryloyloxyoctyl or 9-methacryloyloxynonyl.

If R is an alkyl or alkenyl radical which is monosubstituted by CN or CF$_3$, this radical is preferably straight-chain. The substitution by CN or CF$_3$ is in any desired position.

If R is an at least mono-halogen-substituted alkyl or alkenyl radical, this radical is preferably straight-chain and halogen is preferably F or Cl. In the case of multiple substitution, halogen is preferably F. The resultant radicals also include perfluorinated radicals. In the case of monosubstitution, the fluorine or chlorine substituent can be in any desired position, but is preferably in the ω-position.

Compounds of the formula I which contain wing groups R which are suitable for polymerization reactions are suitable for the preparation of the liquid-crystalline polymers.

Compounds of the formula I containing branched wing groups R may occasionally be of importance owing to better solubility in the conventional liquid-crystalline base materials, but in particular as chiral dopants if they are optically active. Smectic compounds of this type are suitable as components of ferro-electric materials.

Compounds of the formula I having S$_A$ phases are suitable, for example, for thermally addressed displays.

Branched groups generally contain not more than one chain branch. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methyl-propoxy, 2-methylbutoxy, 3-methylbutoxy, 2-methyl-pentoxy, 3-methylpentoxy, 2-ethylhexoxy, 1-methylhexoxy or 1-methylheptoxy.

If R is an alkyl radical in which two or more CH$_2$ groups have been replaced by —O— and/or —CO—O—, this can be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-bis-carboxypentyl, 6,6-biscarboxyhexyl, 7,7-biscarboxyheptyl, 8,8-biscarboxyoctyl, 9,9-biscarboxynonyl, 10,10-biscarboxydecyl, bis (methoxycarbonyl)methyl, 2,2-bis(methoxycarbonyl)ethyl, 3,3-bis(methoxycarbonyl)propyl, 4,4-bis(methoxycarbonyl) butyl, 5,5-bis-(methoxycarbonyl)pentyl, 6,6-bis(methoxycarbonyl)hexyl, 7,7-bis(methoxycarbonyl)heptyl, 8,8-bis-(methoxycarbonyl)octyl, bis(ethoxycarbonyl)methyl, 2,2-bis(ethoxycarbonyl)ethyl, 3,3-bis(ethoxy-carbonyl)propyl, 4,4-bis(ethoxycarbonyl)butyl or 5,5-bis(ethoxycarbonyl) hexyl.

Z is preferably a single bond, —COO— or a —CH$_2$CH$_2$- bridge.

The compounds of the formula I are prepared by methods known per se, as described in the literature (for example in the standard works, such as Houben-Weyl, Methoden der Organischen Chemie [Methods of Organic Chemistry], Georg-Thieme-Verlag, Stuttgart, to be precise under reaction conditions which are known and suitable for said reactions. Use can also be made here of variants which are known per se, but are not mentioned here in greater detail. Furthermore, the compounds of the formula I can be prepared as described in the patent applications DE 40 23 107 A1 and EP 0 418 362 A1.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which comprise media of this type, and to the use of these media for electro-optical purposes.

The liquid-crystal mixtures according to the invention allow a significant increase in the parameter latitude which is available.

The achievable combinations of clearing point, viscosity at low temperature, thermal and UV stability, optical anisotropy and threshold voltage are far superior to the known materials from the prior art.

The requirement for a high clearing point, nematic phase at low temperature and low birefringence (An) and simultaneously a low threshold voltage has hitherto only been achieved inadequately. Although liquid-crystal mixtures such as, for example, MLC-6476 and MLC-6625 (Merck KGaA, Darmstadt, Germany) have comparable clearing points and low-temperature stabilities, they both have, however, much higher An values of about 0.075 and much higher threshold voltages of about ≧1.7 V or more.

While retaining the nematic phase down to −20° C., preferably down to −30° C., particularly preferably down to −40° C., and clearing points above 80° C., preferably above 90° C., particularly preferably above 100° C., the liquid-crystal mixtures according to the invention simultaneously allow birefringence values of ≦0.08, preferably ≦0.07, particularly preferably ≦0.065, and a low threshold voltage, allowing excellent STN and MLC displays, in particular reflective MLC displays, to be achieved. In particular, the mixtures are characterized by low operating voltages. The TN thresholds are usually below 1.9 V, preferably below 1.7 V, particularly preferably ≦1.5 V. Reflective displays in particular are distinguished by TN thresholds of <1.5 V.

It goes without saying that a suitable choice of the components of the mixtures according to the invention also allows higher clearing points (for example above 110° C.) to be achieved at the same time as lower dielectric anisotropy values and thus higher threshold voltages, or lower clearing points to be achieved at the same time as higher dielectric anisotropy values (for example >12) and thus lower threshold voltages (for example <1.5 V) while retaining the other advantageous properties. Likewise, mixtures of higher Δε and thus lower thresholds can also be obtained at viscosities which are increased correspondingly little. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975], where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. Thus, significantly higher specific resistance values can be achieved using the mixtures according to the invention at the first minimum than in the case of mixtures comprising cyano compounds. Through a suitable choice of the individual components and their proportions by weight, the person skilled in the art can set the birefringence necessary for a specified layer thickness of the MLC display using simple routine methods. The requirements of reflective MLC displays are described, for example, in Digest of Technical Papers, SID Symposium 1998.

The rotational viscosity $\gamma_1$ at 20° C. is preferably <150 mPa.s, particularly preferably <120 mPa.s. The nematic phase range is preferably at least 90°, in particular at least 1000. This range preferably extends at least from −200 to +80°.

Measurements of the capacity holding ratio, also known as the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I have an adequate HR for MLC displays.

The media according to the invention preferably comprise a plurality (preferably two, three or more) of compounds of the formula I, i.e. the proportion of these compounds is 5–95%, preferably 10–60%, particularly preferably in the range 8–40%.

The individual compounds of the formulae I to XV and their sub-formulae which can be used in the media according to the invention are either known or can be prepared analogously to the known compounds.

Preferred embodiments are indicated below.

A mixture comprising one or more compounds of the formulae Ia to In:

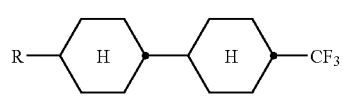

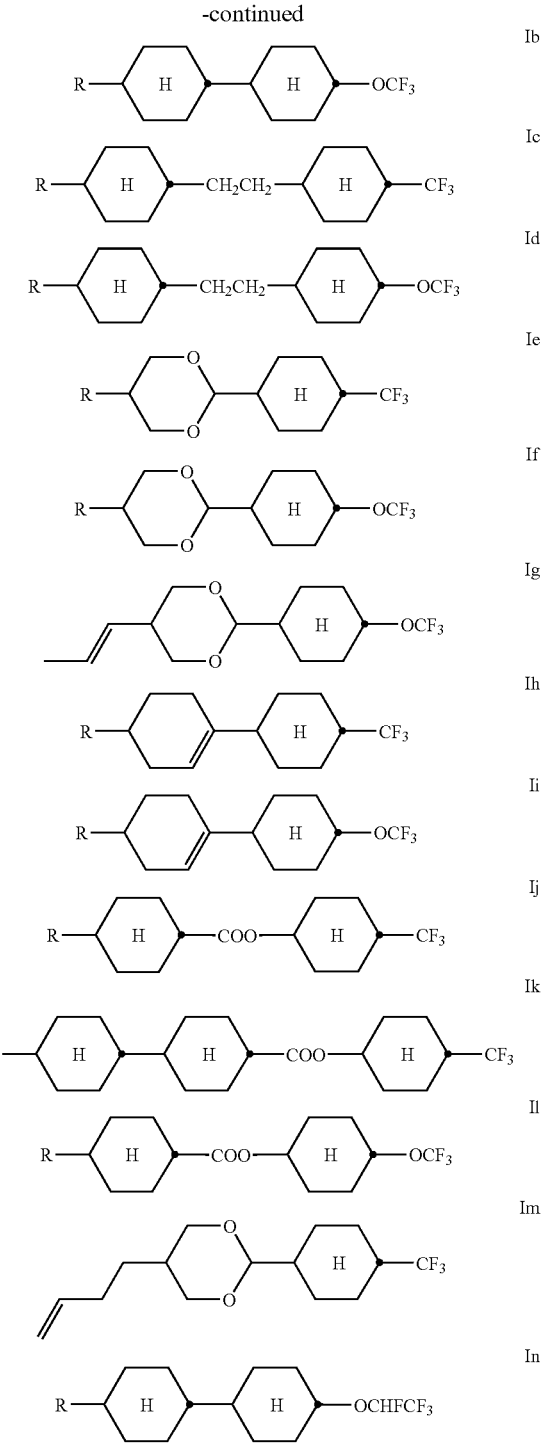

in which R is as defined in claim 1, but is preferably a straight-chain alkyl radical;

The medium simultaneously comprises one or more compounds of the formula Ib and of the formula Ie;

The medium simultaneously comprises one or more compounds of the formula Ij and of the formula Ik;

The medium additionally comprises one or more compounds selected from the group consisting of the general formulae II to VIII:

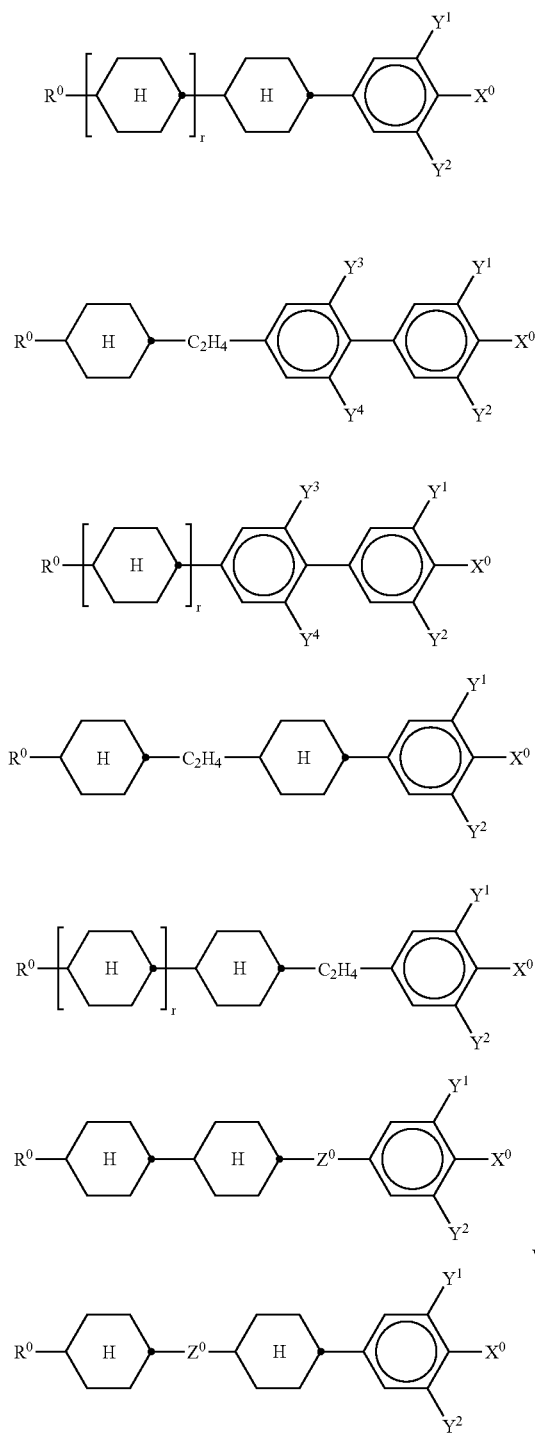

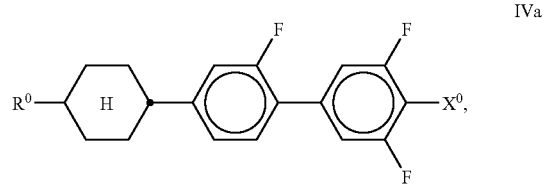

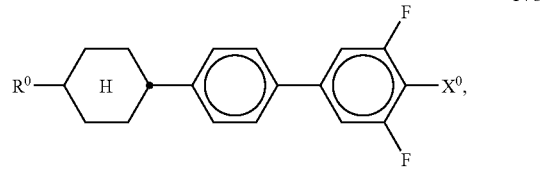

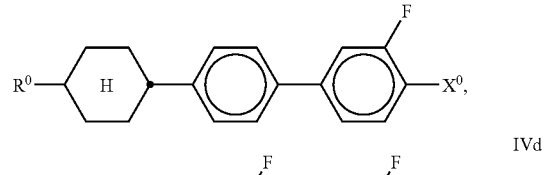

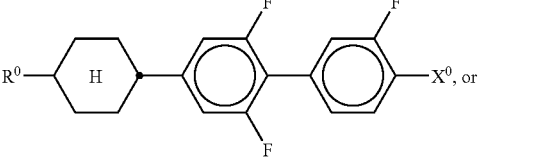

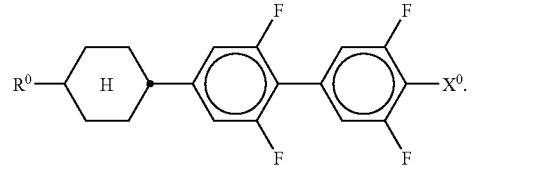

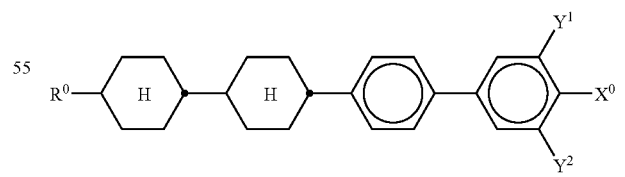

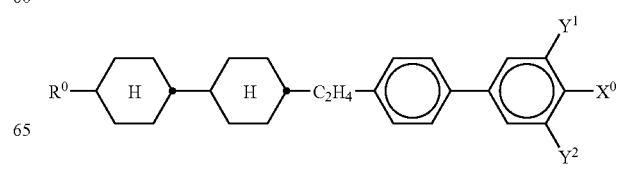

in which the individual radicals have the following meanings:

$R^0$: n-alkyl, oxaalkyl, fluoroalkyl or alkenyl, in each case having up to 0.9 carbon atoms;

$X^0$: F, Cl, halogenated alkyl or alkoxy having 1 to 6 carbon atoms or halogenated alkenyl having 2 to 6 carbon atoms;

$Z^0$: —$C_4H_8$—, —$CF_2O$—, —$OCF_2$—, —$C_2F_4$—, —$CH_2O$—, —$OCH_2$— or —COO—;

$Y^1$, $Y^2$, $Y^3$ and $Y^4$: each, independently of one another, H or F;

r: 0 or 1.

The compound of the formula IV is preferably

The medium additionally comprises one or more compounds selected from the group consisting of the compounds of the general formulae IX to XV:

-continued

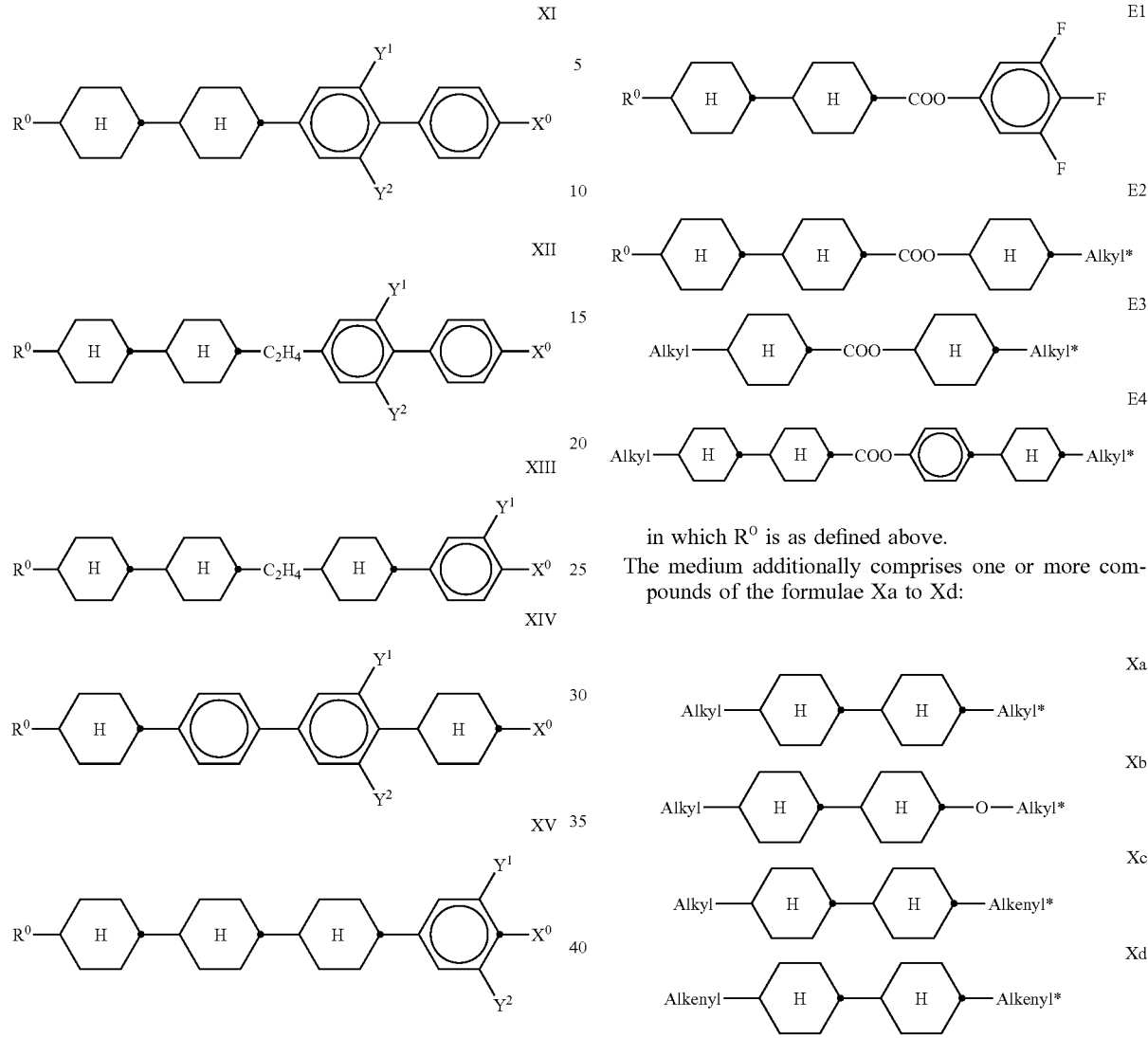

in which $R^0$, $X^0$, $Y^1$ and $Y^2$ are each, independently of one another, as defined in claim 2. $X^0$ is preferably F, Cl, $CF_3$, $OCF_3$ or $OCHF_2$. $R^0$ is preferably alkyl, oxaalkyl, fluoroalkyl or alkenyl, each having up to 6 carbon atoms.

The medium additionally comprises one or more compounds of the formula

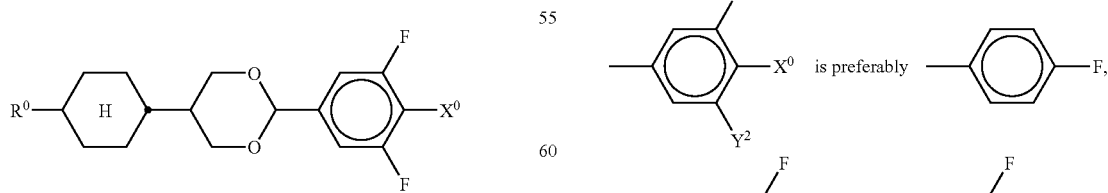

in which $R^0$ and $X^0$ are as defined above.

The medium additionally comprises one or more ester compounds of the formulae E1 to E4:

in which $R^0$ is as defined above.

The medium additionally comprises one or more compounds of the formulae Xa to Xd:

- The proportion of compounds of the formulae I to VIII in the mixture as a whole is at least 50% by weight;
- The proportion of compounds of the formula I in the mixture as a whole is from 5 to 50% by weight;
- The proportion of compounds of the formulae II to VIII in the mixture as a whole is from 20 to 80% by weight;

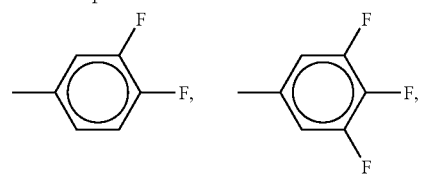

-continued

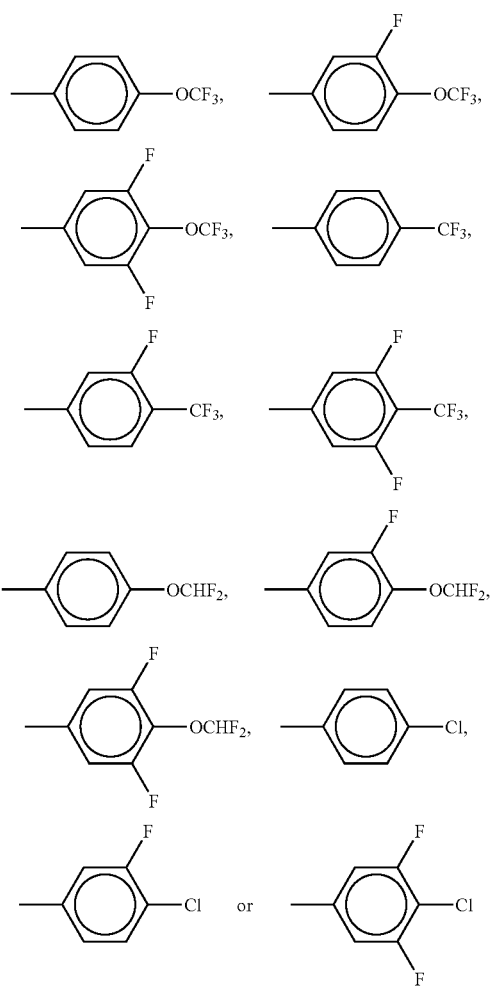

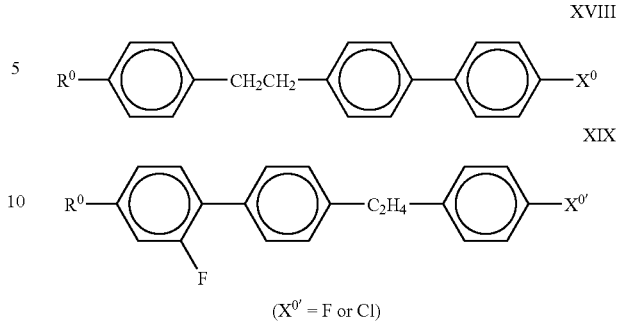

The medium comprises compounds of the formulae II, III, IV, V, VI, VII or VIII;

$R^0$ is straight-chain alkyl or alkenyl having 2 to 7 carbon atoms;

The medium essentially consists of compounds of the formulae I to VIII;

The medium comprises a mixture of compounds of the formula I in which Y is $CF_3$ and/or $OCF_3$;

The medium comprises further compounds, preferably selected from the following group consisting of the general formulae XVI to XIX;

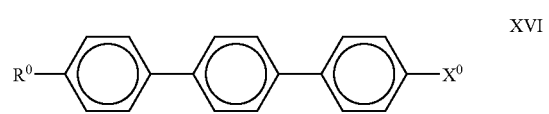

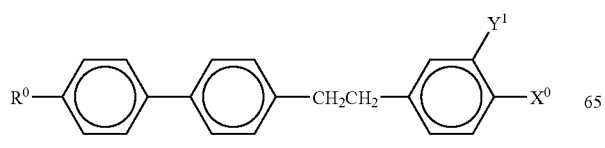

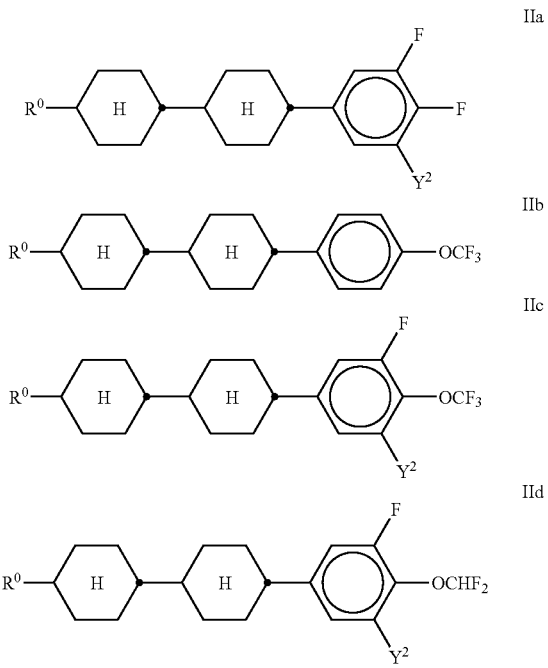

($X^{0'}$ = F or Cl)

in which $R^0$ and $X^0$ are as defined above, and the 1,4-phenylene rings may be substituted by CN, chlorine or fluorine. The 1,4-phenylene rings are preferably mono- or polysubstituted by fluorine atoms.

The I: (II+III+IV+V, +VI+VII+VIII) weight ratio is preferably 1:10 to 10:1;

The medium essentially consists of compounds selected from the group consisting of the general formulae I to XV;

The proportion of compounds of the formulae Xa to Xd in the mixture as a whole is 3–45% by weight, preferably 5–40% by weight, in particular 5–30% by weight;

The proportion of compounds of the formula E1 in the mixture as a whole is 10–60% by weight, preferably 10–45% by weight, in particular 15–40% by weight;

The compound of the formula II is preferably selected from the sub-formulae IIa to IId:

The proportion of compounds of the formulae E2 and/or E3 in the mixture as a whole is 1–30% by weight, preferably 3–20% by weight, in particular 3–15% by weight;

The proportion of compounds of the formula E4 in the mixture as a whole is <20% by weight, in particular ≦10% by weight.

It has been found that even a relatively small proportion of compounds of the formula I mixed with conventional liquid-crystal materials, but in particular with one or more compounds of the formulae II, III, IV, V, VI, VII and/or VIII results in a significant reduction in the threshold voltage and low birefringence values, where broad nematic phases with low smectic-nematic transition temperatures are simultaneously observed, improving the storage stability. Particular preference is given to mixtures which, in addition to one or more compounds of the formula I, comprise one or more compounds of the formula IV, in particular compounds of the formula IVa in which $X^0$ is F or $OCF_3$.

The compounds of the formulae I to VIII are colourless, stable and readily miscible with one another and with other liquid-crystalline materials.

The term "alkyl" or "alkyl*" preferably covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" or "alkenyl*" preferably covers straight-chain and branched alkenyl groups having 2–7 carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. n is preferably 1 and m is preferably from 1 to 6.

Through suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in short addressing times, improved nematic tendencies and a higher ratio of the elastic constants $k_{33}$ (bend) and $k_{11}$ (splay) compared with alkyl or alkoxy radicals. 4-Alkenyl radicals, 3-alkenyl radicals and the like generally give lower threshold voltages and smaller values of $k_{33}/k_{11}$ compared with alkyl and alkoxy radicals.

A —$CH_2CH_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (higher multiplexability), and vice versa.

The optimum mixing ratio of the compounds of the formulae I and II+III+IV+V+VI+VII+VIII depends substantially on the desired properties, on the choice of the components of the formulae I, II, III, IV, V, VI, VII and/or VIII, and on the choice of any other components which may be present. Suitable mixing ratios within the range given above can easily be determined from case to case.

The total amount of compounds of the formulae I to XV in the mixtures according to the invention is not crucial. The mixtures can therefore comprise one or more further components in order to optimize various properties. However, the observed effect on the addressing times and the threshold voltage is generally greater the higher the total concentration of compounds of the formulae I to XV.

In a particularly preferred embodiment, the media according to the invention comprise compounds of the formulae II to VIII (preferably II, III and/or IV, in particular IVa) in which $X^0$ is F, $OCF_3$, $OCHF_2$, $OCH=CF_2$, $OCF=CF_2$ or $OCF_2$—$CF_2H$. A favourable synergistic effect with the compounds of the formula I results in particularly advantageous properties. In particular, mixtures comprising compounds of the formula I and the formula IVa are distinguished by their low threshold voltages.

The construction of the STN or MLC display according to the invention from polarizers, electrode base plates and surface-treated electrodes corresponds to the conventional construction for displays of this type. The term "conventional construction" is broadly drawn here and also covers all derivatives and modifications of the MLC display, in particular including matrix display elements based on poly-Si TFT or MIM and very particularly reflective displays.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in a lesser amount is dissolved in the components making up the principal constituent, expediently at elevated temperature. It is also possible to mix solutions of the components in an organic solvent, for example in acetone, chloroform or methanol, and to remove the solvent again after thorough mixing, for example by distillation. It is furthermore possible to prepare the mixtures in other conventional manners, for example by using premixtures, for example homologue mixtures, or by using so-called "multi-bottle" systems.

The dielectrics may also comprise further additives known to the person skilled in the art and described in the literature. For example, 0–15%, preferably 0–10%, of pleochroic dyes and/or chiral dopants can be added. The individual compounds added are employed in concentrations of from 0.01 to 6%, preferably from 0.1 to 3%. However, the concentration data for the other constituents of the liquid-crystal mixtures, i.e. of the liquid-crystalline or mesogenic compounds, are given without taking into account the concentration of these additives.

C denotes a crystalline phase, S a smectic phase, $S_c$ a smectic C phase, N a nematic phase and I the isotropic phase.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively n and m are in each case, independently of one another, an integer, in particular 0, 1, 2, 3, 4, 5, 6, 7, 8, 9 or 10. The coding in Table B is self-evident. In Table A, only the acronym for the parent structure is given, followed, separated from the acronym for the parent structure by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | $CF_3$ | H | H |
| nOCF$_3$ | $C_nH_{2n+1}$ | $OCF_3$ | H | H |
| nOCF$_2$ | $C_nH_{2n+1}$ | $OCHF_2$ | H | H |

-continued

| Code for $R^1$, $R^2$, $L^1$, $L^2$ | $R^1$ | $R^2$ | $L^1$ | $L^2$ |
|---|---|---|---|---|
| nS | $C_nH_{2n+1}$ | NCS | H | H |
| rVsN | $C_rH_{2r+1}-CH=CH-C_sH_{2s}-$ | CN | H | H |
| V-T | $CH_2=CH$ | $CF_3$ | H | H |
| V2-T | $CH_2=CH-C_2H_4$ | $CF_3$ | H | H |
| 1V-OT | $CH_3-CH=CH$ | $OCF_3$ | H | H |
| rEsN | $C_rH_{2r+1}-O-C_sH_{2s}-$ | CN | H | H |
| nAm | $C_nH_{2n+1}$ | $COOC_mH_{2m+1}$ | H | H |
| nOCCF$_2$.F.F | $C_nH_{2n+1}$ | $OCH_2CF_2H$ | F | F |

Preferred mixture components are shown in Tables A and B.

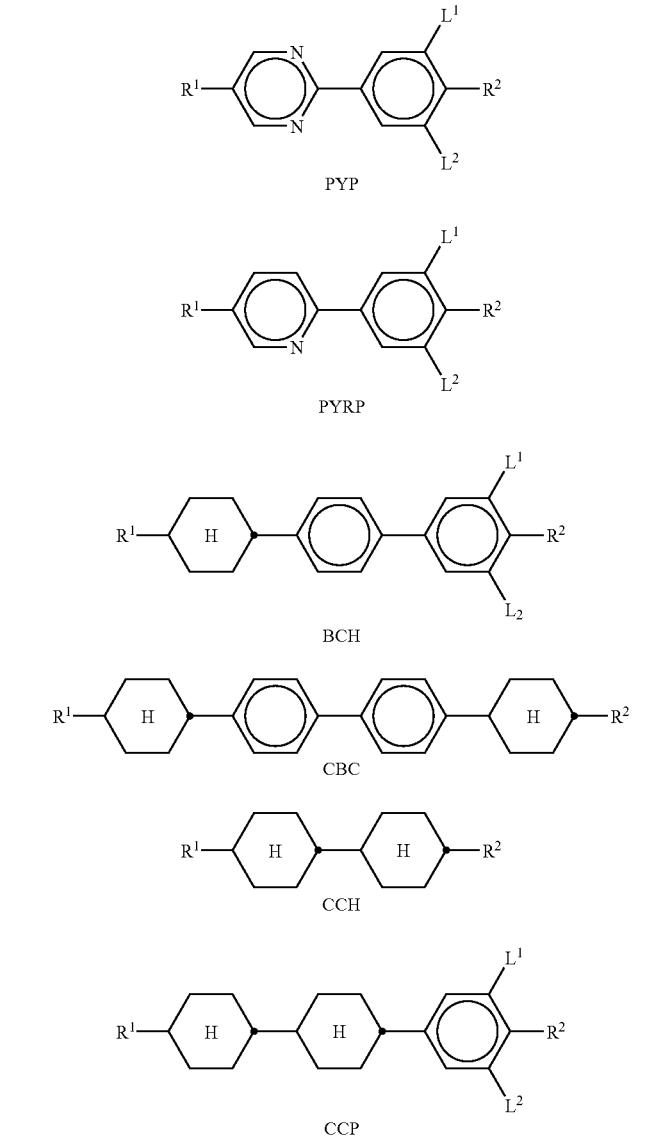

TABLE A

PYP

PYRP

BCH

CBC

CCH

CCP

TABLE A-continued
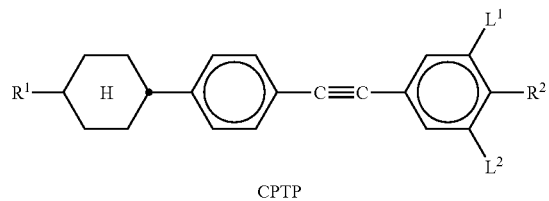
CPTP
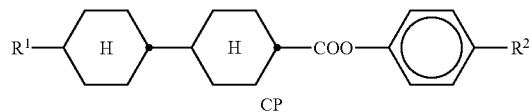
CP
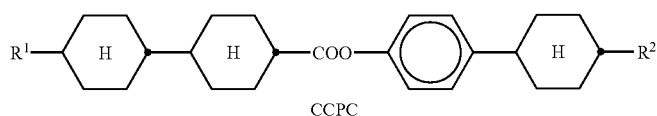
CCPC
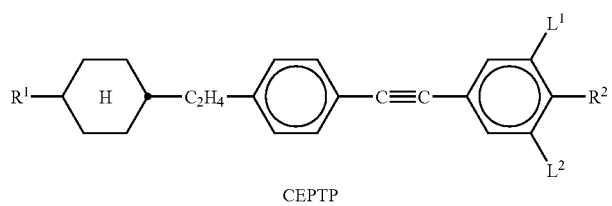
CEPTP
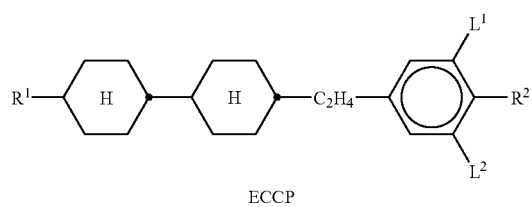
ECCP
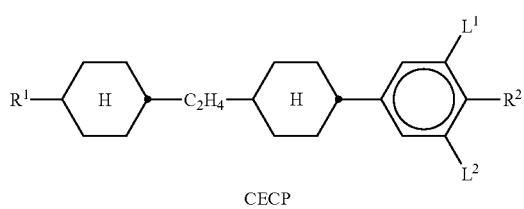
CECP
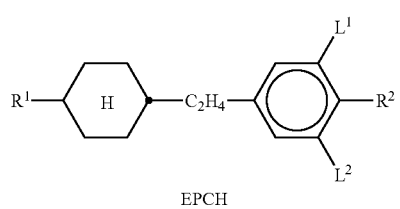
EPCH
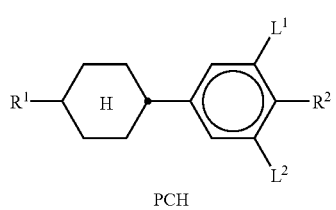
PCH TABLE A-continued
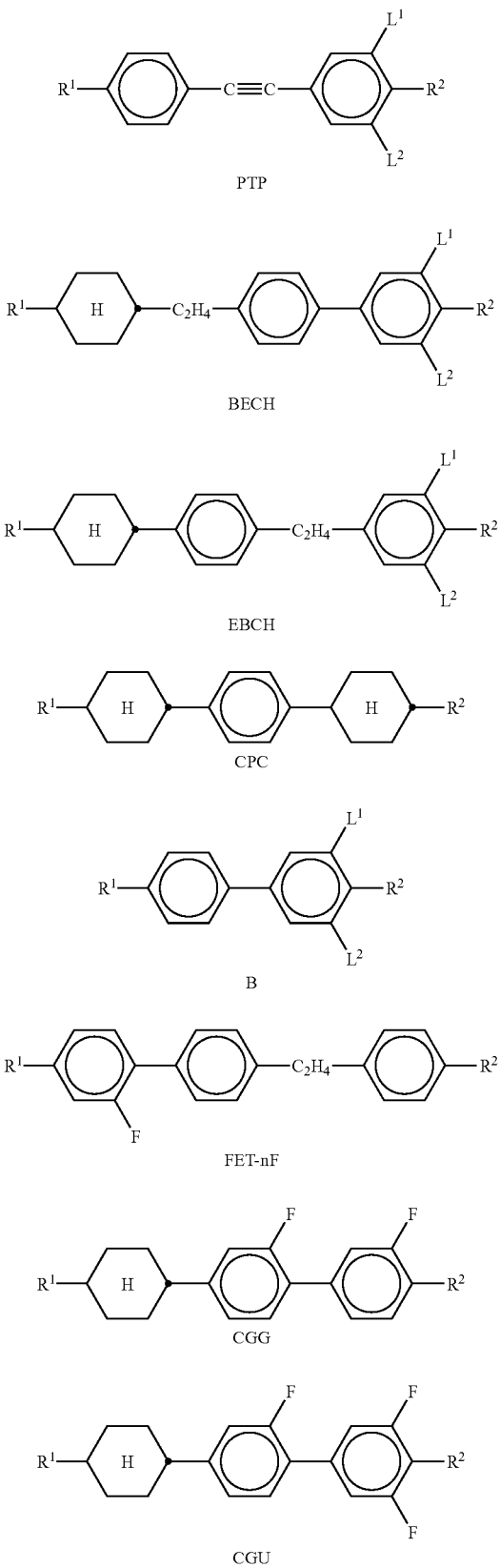

TABLE A-continued
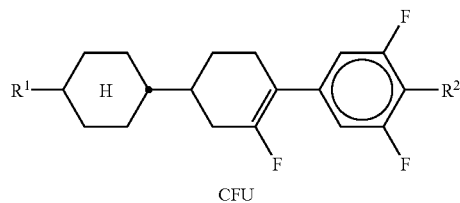
CFU
TABLE B
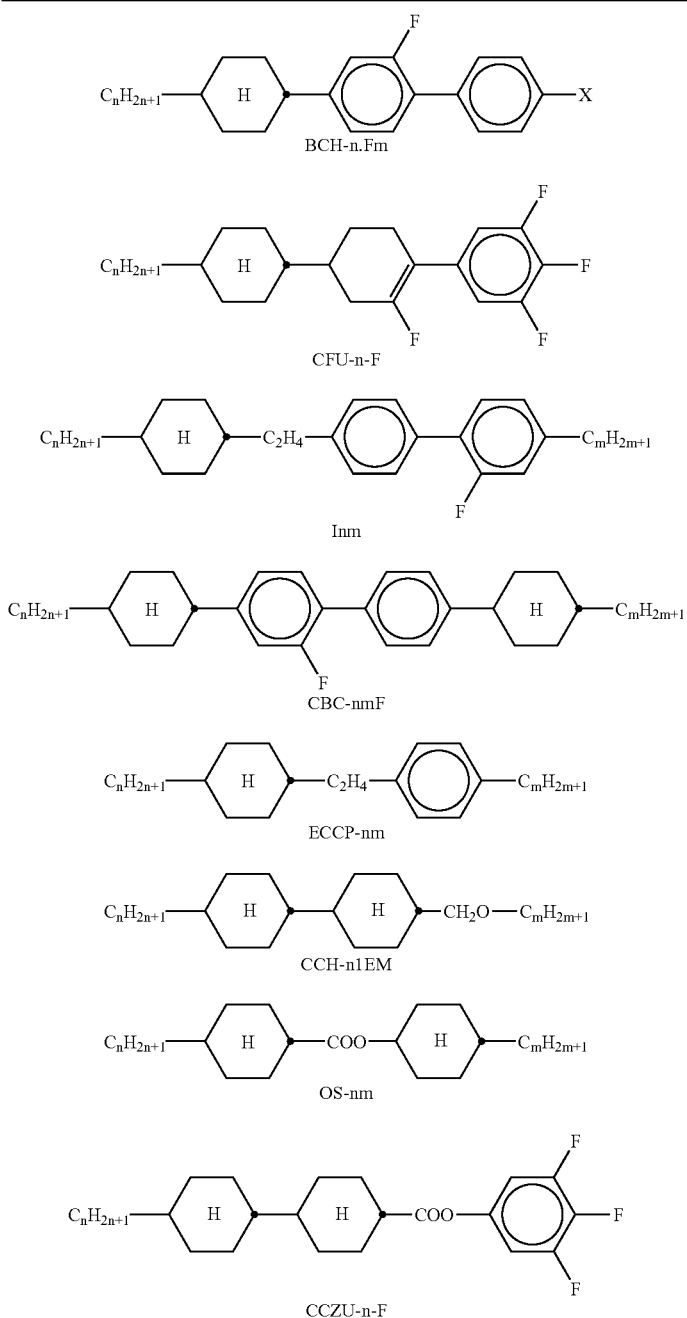

TABLE B-continued
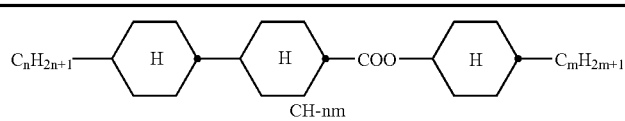
CH-nm
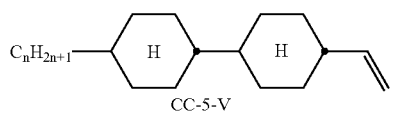
CC-5-V
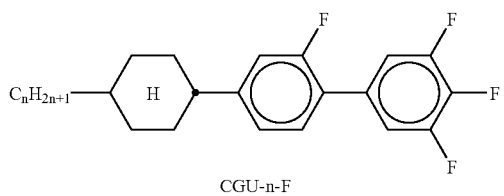
CGU-n-F
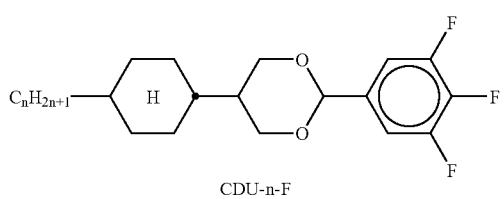
CDU-n-F
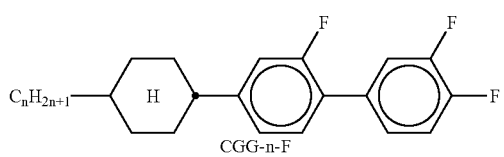
CGG-n-F
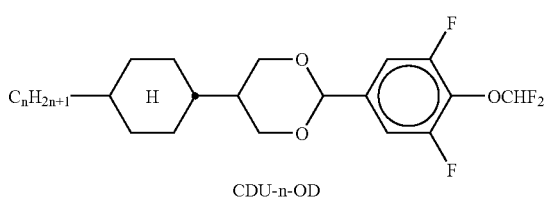
CDU-n-OD
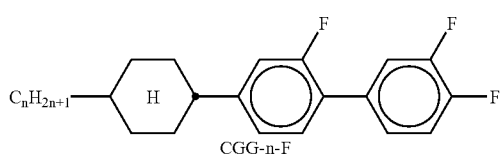
CGG-n-F
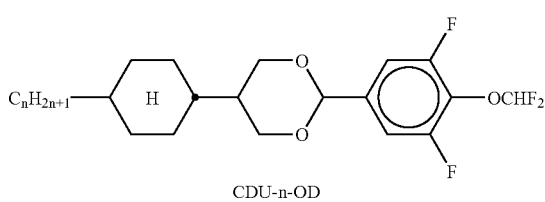
CDU-n-OD
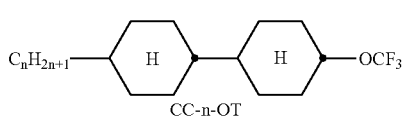
CC-n-OT
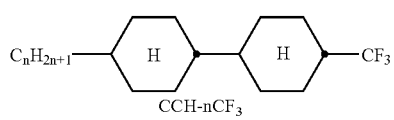
CCH-nCF$_3$ TABLE B-continued
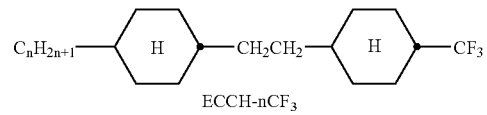
ECCH-nCF$_3$
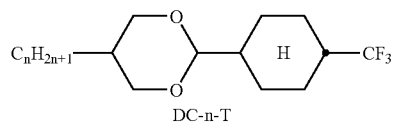
DC-n-T
CCZC-n-T
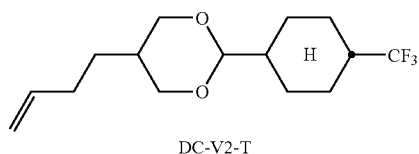
DC-V2-T
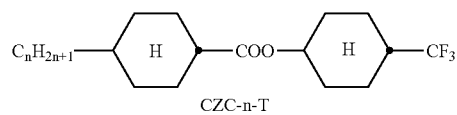
CZC-n-T
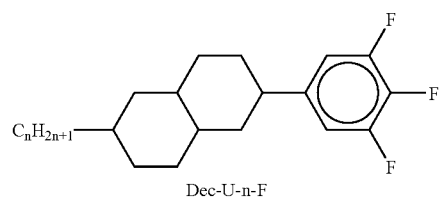
Dec-U-n-F
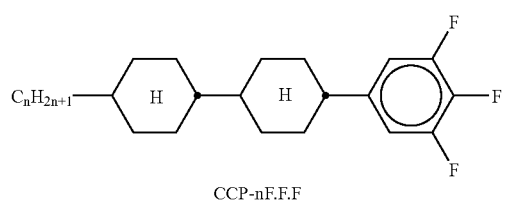
CCP-nF.F.F
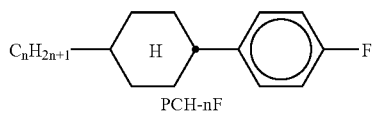
PCH-nF
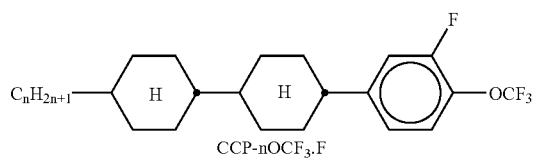
CCP-nOCF$_3$.F
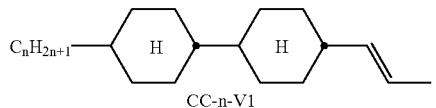
CC-n-V1

TABLE B-continued

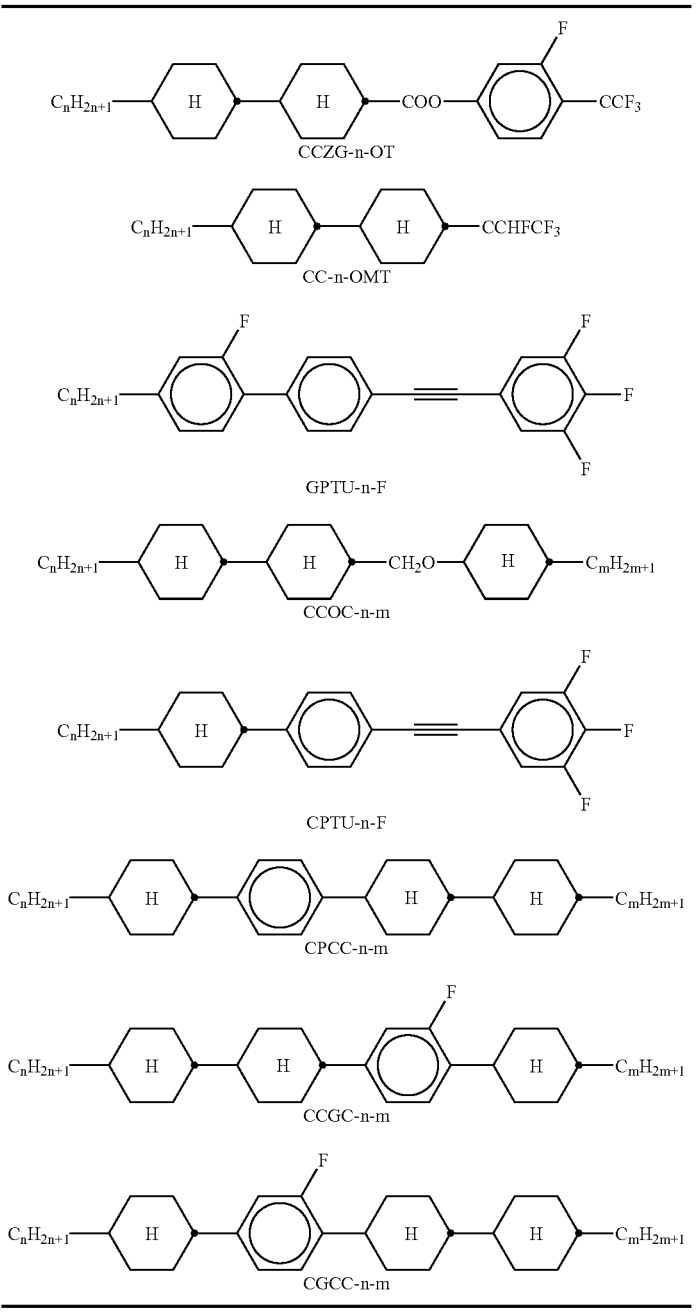

Particularly preferred liquid-crystalline mixtures are those comprising not only one, two or three compounds of the formula I but also one, two, three, four, five, six or more compounds from Table B.

The examples below are intended to illustrate the invention without representing a limitation. Above and below, percentages are percent by weight. All temperatures are given in degrees Celsius. m.p. denotes melting point, cl.p. clearing point. Furthermore, C=crystalline state, N=nematic phase, S=smectic phase and I=isotropic phase. The numbers between these symbols are the transition temperatures. An denotes the optical anisotropy (589 nm, 20° C.), and the flow viscosity $v_{20}$ (mm2/sec) and rotational viscosity $\gamma_1$ (mPa·s) were each determined at 20° C.

$V_{10}$ denotes the voltage for 10% transmission (viewing direction perpendicular to the plate surface). $t_{on}$ denotes the switch-on time and $t_{off}$ the switch-off time at an operating voltage corresponding to twice the value of $V_{10}$. An denotes the optical anisotropy, and $n_o$ the refractive index. $\Delta\epsilon$ denotes the dielectric anisotropy ($\Delta\epsilon=\epsilon_2-\epsilon_\perp$, where $\epsilon_2$ denotes the dielectric constant parallel to the longitudinal axis of the molecules, and $\epsilon_\perp$ denotes the dielectric constant perpendicular thereto). The electro-optical data were measured in a TN cell at the 1st minimum (i.e. at a d·Δn value of 0.5) at 20° C., unless expressly stated otherwise. The optical data were measured at 20° C., unless expressly stated otherwise.

MIXTURE EXAMPLES

Example 1 - Low Δn TFT mixture

| | | | |
|---|---|---|---|
| CCH-3CF$_3$ | 8.0% | S → N | <−40° C. |
| CCH-5CF$_3$ | 12.0% | Clearing point: | 72° C. |
| CC-5-V | 5.0% | Δn [589 nm, 20° C.]: | +0.0578 |
| CCH-3O3 | 5.0% | Δε [1 kHz, 20° C.]: | +6.5 |
| CCH-5O1 | 12.0% | γ$_1$ [mPa·s, 20° C.]: | 129 |
| CCP-2F.F.F | 12.0% | d·Δn [μm, 20° C.]: | 0.5 |
| CCP-3F.F.F | 6.0% | V$_{10,0,20}$ [V]: | 1.62 |
| CCZU-2-F | 6.0% | | |
| CCZU-3-F | 19.0% | | |
| CCZU-5-F | 6.0% | | |
| CH-33 | 3.0% | | |
| CH-35 | 3.0% | | |
| CCPC-34 | 3.0% | | |

Example 2 - Low Δn TFT mixture

| | | | |
|---|---|---|---|
| ECCH-5CF$_3$ | 20.0% | | |
| CC-5-V | 5.0% | Clearing point: | +74° C. |
| CCH-3O3 | 5.0% | Δn [589 nm, 20° C.]: | +0.0585 |
| CCH-5O1 | 12.0% | Δε [1 kHz, 20° C.]: | +6.5 |
| CCP-2F.F.F | 12.0% | γ$_1$ [mPa·s, 20° C.]: | 141 |
| CCP-3F.F.F | 6.0% | d·Δn [μm, 20° C.]: | 0.5 |
| CCZU-2-F | 6.0% | Twist: | 90° C. |
| CCZU-3-F | 19.0% | V$_{10,0,20}$ [V]: | 1.69 |
| CCZU-5-F | 6.0% | | |
| CH-33 | 3.0% | | |
| CH-35 | 3.0% | | |
| CCPC-34 | 3.0% | | |

Example 3 - Low Δn TFT mixture

| | | | |
|---|---|---|---|
| CCH-3CF$_3$ | 9.0% | S → N | <−30° C. |
| CCH-5CF$_3$ | 12.0% | Clearing point: | 78.5° C. |
| CC-5-V | 5.0% | Δn [589 nm, 20° C.]: | +0.0646 |
| CH-33 | 3.0% | Δε [1 kHz, 20° C.]: | +8.8 |
| CCP-2F.F.F | 12.0% | γ$_1$ [mPa·s, 20° C.]: | 140 |
| CCP-3F.F.F | 12.0% | d·Δn [μm, 20° C.]: | 0.5 |
| CCP-5F.F.F | 5.0% | Twist: | 90° C. |
| CCP-2OCF$_3$.F | 6.0% | V$_{10,0,20}$ [V]: | 1.43 |
| CCZU-2-F | 6.0% | | |
| CCZU-3-F | 20.0% | | |
| CCZU-5-F | 6.0% | | |
| CCPC-34 | 4.0% | | |

Example 4 - Low Δn TFT mixture

| | | | |
|---|---|---|---|
| ECCH-5CF$_3$ | 21.0% | | |
| CC-5-V | 5.0% | Clearing point: | +82.0° C. |
| CH-33 | 3.0% | Δn [589 nm, 20° C.]: | +0.0654 |
| CCP-2F.F.F | 12.0% | Δε [1 kHz, 20° C.]: | +8.5 |
| CCP-3F.F.F | 12.0% | γ$_1$ [mPa·s, 20° C.]: | 165 |
| CCP-5F.F.F | 5.0% | d·Δn [μm, 20° C.]: | 0.5 |
| CCP-2OCF$_3$.F | 6.0% | V$_{10,0,20}$ [V]: | 1.49 |
| CCZU-2-F | 6.0% | | |
| CCZU-3-F | 20.0% | | |
| CCZU-5-F | 6.0% | | |
| CCPC-34 | 4.0% | | |

Example 5 - Low Δn TFT mixture

| | | | |
|---|---|---|---|
| CCH-3CF$_3$ | 10.0% | S → N | <−30° C. |
| CCH-5CF$_3$ | 14.0% | Clearing point: | +72.0° C. |
| CCH-3O2 | 7.0% | Δn [589 nm, 20° C.]: | +0.0560 |
| CCH-3O3 | 5.0% | V$_{10,0,20}$ [V]: | 1.87 |
| CCH-5O1 | 12.0% | | |
| CCP-2F.F.F | 9.0% | | |
| CCZU-2-F | 6.0% | | |
| CCZU-3-F | 19.0% | | |
| CCZU-5-F | 6.0% | | |
| CH-33 | 3.0% | | |
| CH-35 | 3.0% | | |
| CH-43 | 2.0% | | |
| CCPC-33 | 2.0% | | |
| CCPC-34 | 2.0% | | |

Example 6 - Low Δn TFT mixture

| | | | |
|---|---|---|---|
| CCH-3CF$_3$ | 8.0% | S → N | <−30° C. |
| CCH-5CF$_3$ | 12.0% | Clearing point: | +70.5° C. |
| OS-33 | 6.0% | Δn [589 nm, 20° C.]: | +0.0562 |
| CCH-3O2 | 4.0% | V$_{10,020}$ [V]: | 1.80 |
| CCH-3O3 | 5.0% | | |
| CCH-5O1 | 12.0% | | |
| CCP-2F.F.F | 12.0% | | |
| CCZU-2-F | 6.0% | | |
| CCZU-3-F | 19.0% | | |
| CCzU-5-F | 6.0% | | |
| CH-33 | 3.0% | | |
| CH-35 | 3.0% | | |
| CCPC-33 | 2.0% | | |
| CCPC-34 | 2.0% | | |

Example 7 - Low Δn TFT mixture

| | | | |
|---|---|---|---|
| CCH-3OCF$_3$ | 10.0% | | |
| CCH-5OCF$_3$ | 14.0% | Clearing point: | +75.5° C. |
| CCH-3O2 | 7.0% | Δn [589 nm, 20° C.]: | +0.0572 |
| CCH-3O3 | 7.0% | d·Δn [μm, 20° C.]: | 0.5 |
| CCH-5O1 | 10.0% | V$_{10,0,20}$ [V]: | 1.74 |
| CCP-2F.F.F | 9.0% | Twist: | 90° |
| CCZU-2-F | 6.0% | | |
| CCZU-3-F | 19.0% | | |
| CCZU-5-F | 6.0% | | |
| CH-33 | 3.0% | | |
| CH-35 | 3.0% | | |
| CH-43 | 3.0% | | |
| CCPC-33 | 3.0% | | |

Example 8 - Low Δn TFT mixture

| | | | |
|---|---|---|---|
| DC-V2-T | 15.0% | S → N | <−30° C. |
| CCH-3O2 | 15.0% | Clearing point: | +69.0° C. |
| CH-34 | 4.0% | Δn [589 nm, 20° C.]: | +0.0568 |
| CCH-5O1 | 10.0% | d·Δn [μm, 20° C.]: | 0.49 |
| CCP-2F.F.F | 12.0% | V$_{10,0,20}$ [V]: | 1.53 |
| CCZU-2-F | 6.0% | Twist: | 90° |
| CCZU-3-F | 20.0% | | |
| CCZU-5-F | 6.0% | | |
| CH-33 | 3.0% | | |
| CH-35 | 3.0% | | |
| CH-43 | 3.0% | | |
| CCPC-33 | 3.0% | | |

Example 9 - Low Δn TFT mixture

| | | | |
|---|---|---|---|
| CCH-3O1 | 14.0% | S → N | <−30° C. |
| CCH-5O1 | 11.0% | Clearing point: | +80.0° C. |
| CCP-2F.F.F | 10.0% | Δn [589 nm, 20° C.]: | +0.0607 |
| CCP-3F.F.F | 13.0% | d·Δn [μm, 20° C.]: | 0.55 |
| CCP-5F.F.F | 5.0% | V$_{10,0,20}$ [V]: | 1.53 |
| CCZU-2-F | 5.0% | Twist: | 90° |
| CCZU-3-F | 17.0% | | |
| CCZU-5-F | 5.0% | | |
| CH-33 | 3.0% | | |
| CH-35 | 3.0% | | |
| CH-43 | 3.0% | | |
| CCPC-33 | 3.0% | | |
| CCH-3CF$_3$ | 8.0% | | |

Example 10 - Reflective TN mixture

| | | | |
|---|---|---|---|
| CCH-3O1 | 11.5% | S → N | <−30° C. |
| CCP-2F.F.F | 10.0% | Clearing point: | +80.0° C. |
| CCP-3F.F.F | 13.0% | Δn [589 nm, 20° C.]: | +0.0654 |
| CCP-5F.F.F | 5.0% | d·Δn [μm, 20° C.]: | 0.55 |
| CCZU-2-F | 5.0% | V$_{10,0,20}$ [V]: | 1.38 |
| CCZU-3-F | 16.0% | Twist: | 90° |
| CCZU-5-F | 4.0% | | |
| CCP-2OCF$_2$.F.F | 5.0% | | |
| CCP-3OCF$_2$.F.F | 6.0% | | |
| CCP-5OCF$_2$.F.F | 6.0% | | |
| CH-33 | 3.0% | | |
| CH-35 | 2.0% | | |
| CH-43 | 2.5% | | |
| CCH-3CF$_3$ | 7.0% | | |
| CCH-5CF$_3$ | 4.0% | | |

-continued

Example 11 - Reflective TN mixture

| Component | % | Property | Value |
|---|---|---|---|
| CCH-3O1 | 11.0% | S → N | <−30° C. |
| CCP-2F.F.F | 10.0% | Clearing point: | +76.0° C. |
| CCP-3F.F.F | 13.0% | Δn [589 nm, 20° C.]: | +0.0649 |
| CCP-5F.F.F | 5.0% | d · Δn [µm, 20° C.]: | 0.55 |
| CCZU-2-F | 4.0% | $V_{10,0,20}$ [V]: | 1.39 |
| CCZU-3-F | 15.0% | Twist: | 90° |
| CCZU-5-F | 4.0% | | |
| CCP-2OCF$_2$.F.F | 6.0% | | |
| CCP-3OCF$_2$.F.F | 6.0% | | |
| CCP-5OCF$_2$.F.F | 7.0% | | |
| CH-33 | 3.0% | | |
| CH-43 | 3.0% | | |
| CCH-3CF$_3$ | 8.0% | | |
| CCH-5CF$_3$ | 5.0% | | |

Example 12 - Reflective TN mixture

| Component | % | Property | Value |
|---|---|---|---|
| CCH-3O1 | 6.0% | S → N | <−30° C. |
| CCP-2F.F.F | 10.0% | Clearing point: | +80.0° C. |
| CCP-3F.F.F | 13.0% | Δn [589 nm, 20° C.]: | +0.0652 |
| CCP-5F.F.F | 5.0% | d · Δn [µm, 20° C.]: | 0.55 |
| CCZU-2-F | 5.0% | $V_{10,0,20}$ [V]: | 1.43 |
| CCZU-3-F | 16.0% | Twist: | 90° |
| CCZU-5-F | 4.0% | | |
| CCP-3OCF$_3$.F.F | 6.0% | | |
| CCP-5OCF$_3$.F.F | 6.0% | | |
| CCP-5OCF$_2$.F.F | 5.0% | | |
| CH-33 | 3.0% | | |
| CH-35 | 2.0% | | |
| CH-43 | 2.0% | | |
| CCH-3CF$_3$ | 10.0% | | |
| CCH-5CF$_3$ | 7.0% | | |

Example 13 - Low Δn TFT mixture

| Component | % | Property | Value |
|---|---|---|---|
| CCH-5O1 | 12.0% | S → N | <−40° C. |
| CH-33 | 3.0% | Clearing point: | +81.5° C. |
| CH-35 | 3.0% | Δn [589 nm, 20° C.]: | +0.0604 |
| CH-43 | 3.0% | Δε [1 kHz, 20° C.]: | +8.4 |
| CH-45 | 3.0% | $γ_1$ [mPa · s, 20° C.]: | 160 |
| CCP-2F.F.F | 9.0% | d · Δn [µm, 20° C.]: | 0.5 |
| CCZU-2-F | 6.0% | $V_{10,0,20}$ [V]: | 1.42 |
| CCZU-3-F | 15.0% | Twist: | 90° |
| CCZU-5-F | 6.0% | | |
| CDU-2-F | 9.0% | | |
| CDU-3-F | 9.0% | | |
| CDU-5-F | 3.0% | | |
| CCH-3CF$_3$ | 7.0% | | |
| CCH-5CF$_3$ | 8.0% | | |
| CCPC-34 | 4.0% | | |

Example 14 - Low Δn TFT mixture

| Component | % | Property | Value |
|---|---|---|---|
| CCH-3O1 | 4.0% | S → N | <−40° C. |
| CCH-5O1 | 9.0% | Clearing point: | +80.5° C. |
| CH-33 | 3.0% | Δn [589 nm, 20° C.]: | +0.0640 |
| CH-35 | 3.0% | Δε [1 kHz, 20° C.]: | +7.6 |
| CH-43 | 2.0% | $γ_1$ [mPa · s, 20° C.]: | 161 |
| CCP-2F.F.F | 9.0% | d · Δn [µm, 20° C.]: | 0.5 |
| CCP-3F.F.F | 6.0% | $V_{10,0,20}$ [V]: | 1.28 |
| CCZU-2-F | 6.0% | Twist: | 90° |
| CCZU-3-F | 15.0% | | |
| CCZU-5-F | 6.0% | | |
| CDU-2-F | 10.0% | | |
| CDU-3-F | 9.0% | | |
| CDU-5-F | 7.0% | | |
| CCH-3CF$_3$ | 7.0% | | |
| CCPC-34 | 4.0% | | |

Example 15 - Reflective TN mixture

| Component | % | Property | Value |
|---|---|---|---|
| CCH-3O1 | 12.0% | S → N | <−20° C. |
| CH-33 | 3.0% | Clearing point: | +93.0° C. |
| CH-35 | 3.0% | Δn [589 nm, 20° C.]: | +0.0653 |
| CCP-4OCF$_3$ | 8.0% | d · Δn [µm, 20° C.]: | 0.5 |
| CCP-2F.F.F | 12.0% | $V_{10,0,20}$ [V]: | 1.55 |
| CCP-3F.F.F | 12.0% | Twist: | 90° |
| CCP-5F.F.F | 6.0% | | |
| CCZU-2-F | 6.0% | | |
| CCZU-3-F | 13.0% | | |
| CCZU-5-F | 6.0% | | |
| CZC-3-T | 6.0% | | |
| CCZC-3-T | 10.0% | | |
| CCPC-34 | 3.0% | | |

Example 16

| Component | % | Property | Value |
|---|---|---|---|
| CCH-3CF$_3$ | 9.00% | S → N | <−30° C. |
| CCH-5CF$_3$ | 12.00% | Clearing point: | +80.0° C. |
| CC-5-V | 7.00% | Δn [589 nm, 20° C.]: | +0.0648 |
| CH-33 | 3.00% | d · Δn [20° C., µm]: | 0.50 |
| CCP-2F.F.F | 12.00% | Twist [°]: | 90 |
| CCP-3F.F.F | 11.00% | $V_{10,0,20}$ [V]: | 1.49 |
| CCP-5F.F.F | 6.00% | | |
| CCP-2OCF$_3$.F | 7.00% | | |
| CCZU-2-F | 6.00% | | |
| CCZU-3-F | 16.00% | | |
| CCZU-5-F | 6.00% | | |
| CCPC-34 | 5.00% | | |

Example 17

| Component | % | Property | Value |
|---|---|---|---|
| CCH-5O1 | 7.00% | S → N | <−40° C. |
| CH-33 | 3.00% | Clearing point: | +86.0° C. |
| CH-35 | 3.00% | Δn [589 nm, 20° C.]: | +0.0645 |
| CH-43 | 3.00% | Δε [1 kHz, 20° C.]: | +10.2 |
| CCP-2F.F.F | 7.00% | d · Δn [20° C., µm]: | 0.50 |
| CCP-3F.F.F | 5.00% | Twist [°]: | 90 |
| CCZU-2-F | 6.00% | $V_{10,0,20}$ [V]: | 1.36 |
| CCZU-3-F | 15.00% | | |
| CCZU-5-F | 6.00% | | |
| CDU-2-F | 9.00% | | |
| CDU-3-F | 9.00% | | |
| CDU-5-F | 6.00% | | |
| CCH-3CF$_3$ | 7.00% | | |
| CCH-5CF$_3$ | 8.00% | | |
| CCPC-34 | 3.00% | | |
| CCPC-33 | 3.00% | | |

Example 18

| Component | % | Property | Value |
|---|---|---|---|
| CCH-5O1 | 12.00% | S → N | <−40° C. |
| CH-33 | 3.00% | Clearing point: | +82.5° C. |
| CH-35 | 3.00% | Δn [589 nm, 20° C.]: | +0.0608 |
| CH-43 | 3.00% | d · Δn [20° C., µm]: | 0.50 |
| CH-45 | 3.00% | twist [°]: | 90 |
| CCP-2F.F.F | 6.00% | $V_{10,0,20}$ [V]: | 1.42 |
| CCP-3F.F.F | 4.00% | | |
| CCZU-2-F | 6.00% | | |
| CCZU-3-F | 14.00% | | |
| CCZU-5-F | 6.00% | | |
| CDU-2-F | 8.00% | | |
| CDU-3-F | 8.00% | | |
| CDU-5-F | 5.00% | | |
| CCH-3CF$_3$ | 8.00% | | |
| CCH-5CF$_3$ | 7.00% | | |
| CCPC-34 | 4.00% | | |

Example 19

| Component | % | Property | Value |
|---|---|---|---|
| CCH-301 | 5.00% | S → N | <−40° C. |
| CCH-501 | 16.00% | Clearing point: | +86.0° C. |
| CCP-2F.F.F | 12.00% | Δn [589 nm, 20° C.]: | +0.0622 |
| CCP-3F.F.F | 12.00% | Δε [1 kHz, 20° C.]: | +4.8 |
| CCP-5F.F.F | 6.00% | d · Δn [20° C., µm]: | 0.50 |
| CCP-2OCF$_3$ | 5.00% | twist [°]: | 90 |
| CCP-4OCF$_3$ | 6.00% | $V_{10,0,20}$ [V]: | 1.98 |
| CCP-2OCF$_3$.F | 9.00% | | |
| CH-33 | 4.00% | | |
| CH-35 | 3.00% | | |
| CH-43 | 3.00% | | |
| CH-45 | 3.00% | | |
| CCPC-34 | 4.00% | | |
| CCH-3CF$_3$ | 6.00% | | |
| CCH-5CF$_3$ | 6.00% | | |

Example 20

| Component | % | Property | Value |
|---|---|---|---|
| CH-33 | 3.00% | S → N | <−40° C. |
| CH-35 | 2.00% | Clearing point: | +76.5° C. |
| CCP-2F.F.F | 10.00% | Δn [589 nm, 20° C.]: | +0.0642 |
| CCZU-2-F | 6.00% | d · Δn [20° C., µm]: | 0.50 |
| CCZU-3-F | 16.00% | Twist [°]: | 90 |
| CCZU-5-F | 6.00% | $V_{10}$ [V]: | 1.22 |
| CDU-2-F | 9.00% | | |
| CDU-3-F | 11.00% | | |
| CDU-5-F | 8.00% | | |

-continued

| | | | | |
|---|---|---|---|---|
| CCH-3CF$_3$ | 11.00% | | | |
| CCH-5CF$_3$ | 11.00% | | | |
| CCPC-33 | 4.00% | | | |
| CCPC-34 | 3.00% | | | |

Example 21

| | | | |
|---|---|---|---|
| CH-33 | 4.00% | S → N | <−40° C. |
| CH-35 | 4.00% | Clearing point: | +77.0° C. |
| CH-43 | 2.00% | Δn [589 nm, 20° C.]: | +0.0628 |
| CCP-2F.F.F | 9.00% | d · Δn [20° C., μm]: | 0.50 |
| CCZU-2-F | 6.00% | Twist [°]: | 90 |
| CCZU-3-F | 16.00% | V$_{10}$ [V]: | 1.24 |
| CCZU-5-F | 6.00% | | |
| CDU-2-F | 9.00% | | |
| CDU-3-F | 11.00% | | |
| CDU-5-F | 8.00% | | |
| CCH-3CF$_3$ | 11.00% | | |
| CCH-5CF$_3$ | 10.00% | | |
| CCPC-34 | 4.00% | | |

Example 22

| | | | |
|---|---|---|---|
| CH-33 | 4.00% | S → N | <−30° C. |
| CH-35 | 3.00% | Clearing point: | +82.0° C. |
| CCP-2F.F.F | 10.00% | Δn [589 nm, 20° C.]: | +0.0645 |
| CCZU-2-F | 6.00% | Δε [kHz, 20° C.]: | +11.2 |
| CCZU-3-F | 16.00% | d · Δn [20° C., μm]: | 0.50 |
| CCZU-5-F | 6.00% | Twist [°]: | 90 |
| CDU-2-F | 9.00% | V$_{10}$ [V]: | 1.27 |
| CDU-3-F | 11.00% | | |
| CDU-5-F | 8.00% | | |
| CCH-3CF$_3$ | 11.00% | | |
| CCH-5CF$_3$ | 9.00% | | |
| CCPC-33 | 4.00% | | |
| CCPC-34 | 3.00% | | |

Example 23

| | | | |
|---|---|---|---|
| CH-33 | 4.00% | S → N | <−30° C. |
| CH-35 | 3.00% | Clearing point: | +81.0° C. |
| CH-43 | 3.00% | Δn [589 nm, 20° C.]: | +0.0637 |
| CCP-2F.F.F | 9.00% | d · Δn [20° C., μm]: | 0.50 |
| CCZU-2-F | 6.00% | Twist [°]: | 90 |
| CCZU-3-F | 16.00% | V$_{10}$ [V]: | 1.26 |
| CCZU-5-F | 6.00% | | |
| CDU-2-F | 9.00% | | |
| CDU-3-F | 11.00% | | |
| CDU-5-F | 8.00% | | |
| CCH-3CF$_3$ | 11.00% | | |
| CCH-5CF$_3$ | 9.00% | | |
| CCPC-33 | 2.00% | | |
| CCPC-34 | 3.00% | | |

Example 24

| | | | |
|---|---|---|---|
| CCH-501 | 8.00% | S → N | <−40° C. |
| CH-33 | 4.00% | Clearing point: | +82.0° C. |
| CH-35 | 4.00% | Δn [589 nm, 20° C.]: | +0.0620 |
| CH-43 | 4.00% | d · Δn [20° C., μm]: | 0.50 |
| CCP-2F.F.F | 9.00% | Twist [°]: | 90 |
| CCZU-2-F | 6.00% | V$_{10}$ [V]: | 1.36 |
| CCZU-3-F | 16.00% | | |
| CCZU-5-F | 6.00% | | |
| CDU-2-F | 9.00% | | |
| CDU-3-F | 11.00% | | |
| CDU-5-F | 3.00% | | |
| CCH-3CF$_3$ | 8.00% | | |
| CCH-5CF$_3$ | 8.00% | | |
| CCPC-34 | 4.00% | | |

Example 25

| | | | |
|---|---|---|---|
| CCH-501 | 12.00% | S → N | <−40° C. |
| CH-33 | 4.00% | Clearing point: | +81.0° C. |
| CH-35 | 4.00% | Δn [589 nm, 20° C.]: | +0.0610 |
| CH-43 | 4.00% | Δε [kHz, 20° C.]: | +8.9 |
| CCP-2F.F.F | 9.00% | γ$_1$ [mPa · s, 20° C.]: | 154 |
| CCZU-2-F | 6.00% | d · Δn [20° C., μm]: | 0.50 |
| CCZU-3-F | 16.00% | Twist [°]: | 90 |
| CCZU-5-F | 6.00% | V$_{10}$ [V]: | 1.41 |
| CDU-2-F | 9.00% | | |
| CDU-3-F | 11.00% | | |
| CCH-3CF$_3$ | 7.00% | | |

-continued

| | | | |
|---|---|---|---|
| CCH-5CF$_3$ | 8.00% | | |
| CCPC-34 | 4.00% | | |

| | | Example 26 | |
|---|---|---|---|
| CCH-303 | 5.00% | | |
| CCH-501 | 16.00% | Clearing point: | +90.0° C. |
| CCP-2F.F.F | 12.00% | Δn [589 nm, 20° C.]: | +0.0628 |
| CCP-3F.F.F | 12.00% | d · Δn [20° C., μm]: | 0.50 |
| CCP-5F.F.F | 6.00% | Twist [°]: | 90 |
| CCP-20CF$_3$ | 5.00% | V$_{10}$ [V]: | 2.08 |
| CCP-40CF$_3$ | 7.00% | | |
| CCP-20CF$_3$.F | 6.00% | | |
| CH-33 | 4.00% | | |
| CH-35 | 3.00% | | |
| CH-43 | 3.00% | | |
| CH-45 | 3.00% | | |
| CCPC-33 | 3.00% | | |
| CCPC-34 | 2.00% | | |
| CCH-3CF$_3$ | 6.00% | | |
| CCH-5CF$_3$ | 7.00% | | |

Example 27

| | | | |
|---|---|---|---|
| CCH-3CF$_3$ | 8.00% | S → N | <−40° C. |
| CCH-5CF$_3$ | 8.00% | Clearing point: | +87.5° C. |
| CCH-303 | 10.00% | Δn [589 nm, 20° C.]: | +0.0628 |
| CCH-501 | 6.00% | Δε [kHz, 20° C.]: | +7.3 |
| CCP-2F.F.F | 11.00% | d · Δn [20° C., μm]: | 0.50 |
| CCP-3F.F.F | 10.00% | Twist [°]: | 90 |
| CCP-5F.F.F | 5.00% | V$_{10}$ [V]: | 1.69 |
| CCZU-2-F | 6.00% | | |
| CCZU-3-F | 16.00% | | |
| CCZU-5-F | 6.00% | | |
| CCPC-33 | 3.00% | | |
| CCPC-34 | 2.00% | | |
| CH-33 | 3.00% | | |
| CH-35 | 3.00% | | |
| CH-43 | 3.00% | | |

Example 28

| | | | |
|---|---|---|---|
| CCH-3CF$_3$ | 6.00% | S → N | <−40° C. |
| CCH-5CF$_3$ | 8.00% | Clearing point: | +83.5° C. |
| CCH-303 | 10.00% | Δn [589 nm, 20° C.]: | +0.0620 |
| CCH-501 | 6.00% | d · Δn [20° C., μm]: | 0.50 |
| CCP-2F.F.F | 10.00% | Twist [°]: | 90 |
| CCP-3F.F.F | 7.00% | V$_{10}$ [V]: | 1.58 |
| CCP-5F.F.F | 5.00% | | |
| CDU-2-F | 10.00% | | |
| CDU-3-F | 10.00% | | |
| CDU-5-F | 8.00% | | |
| CCPC-33 | 3.00% | | |
| CCPC-34 | 3.00% | | |
| CH-33 | 4.00% | | |
| CH-35 | 4.00% | | |
| CH-43 | 3.00% | | |
| CH-45 | 3.00% | | |

Example 29

| | | | |
|---|---|---|---|
| CCH-303 | 15.00% | S → N | <−30° C. |
| CH-33 | 3.00% | Clearing point: | +85.0° C. |
| CH-35 | 3.00% | Δn [589 nm, 20° C.]: | +0.0615 |
| CH-43 | 3.00% | d · Δn [20° C., μm]: | 0.50 |
| CH-45 | 3.00% | Twist [°]: | 90 |
| CCP-2F.F.F | 7.00% | V$_{10}$ [V]: | 1.53 |
| CCZU-2-F | 6.00% | | |
| CCZU-3-F | 17.00% | | |
| CCZU-5-F | 6.00% | | |
| CDU-2-F | 10.00% | | |
| CDU-3-F | 9.00% | | |
| CCH-3CF$_3$ | 7.00% | | |
| CCH-5CF$_3$ | 7.00% | | |
| CCPC-34 | 4.00% | | |

| | | Example 30 | |
|---|---|---|---|
| CCH-303 | 11.00% | | |
| CCH-34 | 5.00% | Clearing point: | +85.0° C. |
| CH-33 | 4.00% | Δn [589 nm, 20° C.]: | +0.0607 |
| CH-35 | 4.00% | d · Δn [20° C., μm]: | 0.50 |
| CH-43 | 3.00% | Twist [°]: | 90 |
| CH-45 | 3.00% | V$_{10}$ [V]: | 1.55 |
| CCP-2F.F.F | 4.00% | | |

-continued

| | |
|---|---|
| CCZU-2-F | 6.00% |
| CCZU-3-F | 17.00% |
| CCZU-5-F | 6.00% |
| CDU-2-F | 10.00% |
| CDU-3-F | 11.00% |
| CCH-3CF$_3$ | 7.00% |
| CCH-5CF$_3$ | 7.00% |
| CCPC-34 | 2.00% |

Example 31

| | | | |
|---|---|---|---|
| CCH-3CF$_3$ | 6.00% | S → N | <−20° C. |
| CCH-5CF$_3$ | 7.00% | Clearing point: | +84.0° C. |
| CCH-34 | 5.00% | Δn [589 nm, 20° C.]: | +0.0617 |
| CC-5-V | 2.00% | | |
| CCH-303 | 11.50% | | |
| CCP-2F.F.F | 9.00% | | |
| CCP-3F.F.F | 5.00% | | |
| CCP-5F.F.F | 3.00% | | |
| CDU-2-F | 11.00% | | |
| CDU-3-F | 11.00% | | |
| CDU-5-F | 10.00% | | |
| CCPC-33 | 2.00% | | |
| CCPC-34 | 3.00% | | |
| CH-33 | 4.00% | | |
| CH-35 | 3.50% | | |
| CH-43 | 3.50% | | |
| CH-45 | 3.50% | | |

Example 32

| | | | |
|---|---|---|---|
| CCH-303 | 12.00% | | |
| CCH-501 | 11.00% | Clearing point: | +86.0° C. |
| CH-33 | 3.00% | Δn [589 nm, 20° C.]: | +0.0610 |
| CH-35 | 3.00% | d · Δn [20° C., μm]: | 0.50 |
| CH-43 | 3.00% | Twist [°]: | 90 |
| CH-45 | 3.00% | V$_{10}$ [V]: | 1.61 |
| CCZU-2-F | 5.00% | | |
| CCZU-3-F | 16.00% | | |
| CCZU-5-F | 5.00% | | |
| CDU-2-F | 9.00% | | |
| CDU-3-F | 9.00% | | |
| CDU-5-F | 7.00% | | |
| CCH-3CF$_3$ | 5.00% | | |
| CCH-5CF$_3$ | 5.00% | | |
| CCPC-34 | 4.00% | | |

Example 33

| | | | |
|---|---|---|---|
| CCH-303 | 14.00% | | |
| CCH-501 | 11.00% | Clearing point: | +86.0° C. |
| CH-33 | 2.50% | Δn [589 nm, 20° C.]: | +0.0612 |
| CH-35 | 2.50% | d · Δn [20° C., μm]: | 0.50 |
| CH-43 | 3.00% | Twist [°]: | 90 |
| CH-45 | 3.00% | V$_{10}$ [V]: | 1.61 |
| CCZU-2-F | 5.00% | | |
| CCZU-3-F | 16.00% | | |
| CCZU-5-F | 5.00% | | |
| CDU-2-F | 9.00% | | |
| CDU-3-F | 9.00% | | |
| CDU-5-F | 8.00% | | |
| CCH-3CF$_3$ | 4.00% | | |
| CCH-5CF$_3$ | 4.00% | | |
| CCPC-34 | 4.00% | | |

Example 34

| | | | |
|---|---|---|---|
| CCH-301 | 8.00% | | |
| CCH-501 | 12.00% | Clearing point: | +84.0° C. |
| CH-33 | 3.00% | Δn [589 nm, 20° C.]: | +0.0614 |
| CH-35 | 3.00% | Δε [kHz, 20° C.]: | +8.3 |
| CH-43 | 3.00% | d · Δn [20° C., μm]: | 0.50 |
| CH-45 | 3.00% | Twist [°]: | 90 |
| CCP-2F.F.F | 9.00% | V$_{10}$ [V]: | 1.48 |
| CCZU-2-F | 5.00% | | |
| CCZU-3-F | 16.00% | | |
| CCZU-5-F | 6.00% | | |
| CDU-2-F | 8.00% | | |
| CDU-3-F | 9.00% | | |
| CDU-5-F | 4.00% | | |
| CCH-3CF$_3$ | 3.00% | | |
| CCH-5CF$_3$ | 4.00% | | |
| CCPC-34 | 4.00% | | |

Example 35

| | | | |
|---|---|---|---|
| CCH-301 | 13.00% | S → N | <−30.0° C. |
| CCH-35 | 6.00% | Clearing point: | +88.5° C. |
| CCH-3CF$_3$ | 8.00% | Δn [589 nm, 20° C.]: | +0.0616 |
| CCP-2F.F.F | 10.00% | d · Δn [20° C., μm]: | 0.50 |
| CCP-3F.F.F | 14.00% | Twist [°]: | 90 |
| CCP-5F.F.F | 6.00% | V$_{10}$ [V]: | 1.63 |
| CCZU-2-F | 5.00% | | |
| CCZU-3-F | 13.00% | | |
| CCZU-4-F | 5.00% | | |
| CCZU-5-F | 5.00% | | |
| CH-33 | 4.00% | | |
| CH-35 | 4.00% | | |
| CH-43 | 3.00% | | |
| CH-45 | 4.00% | | |

Example 36

| | | | |
|---|---|---|---|
| CCH-301 | 13.00% | | |
| CCH-35 | 6.00% | Clearing point: | +83.0° C. |
| PCH-7F | 2.00% | Δn [589 nm, 20° C.]: | +0.0617 |
| CCH-3CF$_3$ | 8.00% | d · Δn [20° C., μm]: | 0.50 |
| CCP-2F.F.F | 10.00% | Twist [°]: | 90 |
| CCP-3F.F.F | 14.00% | V$_{10}$ [V]: | 1.51 |
| CCP-5F.F.F | 6.00% | | |
| CCZU-2-F | 5.00% | | |
| CCZU-3-F | 13.00% | | |
| CCZU-4-F | 5.00% | | |
| CCZU-5-F | 5.00% | | |
| CH-33 | 4.00% | | |
| CH-35 | 3.00% | | |
| CH-43 | 3.00% | | |
| CH-45 | 3.00% | | |

Example 37

| | | | |
|---|---|---|---|
| CCH-301 | 13.00% | Clearing point: | +102.0° C. |
| CCH-35 | 6.00% | Δn [589 nm, 20° C.]: | +0.0644 |
| PCH-7F | 2.00% | | |
| CCH-3CF$_3$ | 8.00% | | |
| CCZU-2-F | 5.00% | | |
| CCZU-3-F | 13.00% | | |
| CCZU-4-F | 5.00% | | |
| CCZU-5-F | 5.00% | | |
| CCZG-2-OT | 10.00% | | |
| CCZG-3-OT | 14.00% | | |
| CCZG-5-OT | 6.00% | | |
| CH-33 | 4.00% | | |
| CH-35 | 3.00% | | |
| CH-43 | 3.00% | | |
| CH-45 | 3.00% | | |

Example 38

| | | | |
|---|---|---|---|
| CCH-301 | 15.00% | S → N | <−20° C. |
| CCH-35 | 6.00% | Clearing point: | +84.5° C. |
| CCH-3CF$_3$ | 8.00% | Δn [589 nm, 20° C.]: | +0.0613 |
| CCP-2F.F.F | 10.00% | d · Δn [20° C., μm]: | 0.50 |
| CCP-3F.F.F | 14.00% | Twist [°]: | 90 |
| CCP-5F.F.F | 6.00% | V$_{10}$ [V]: | 1.58 |
| CCZU-2-F | 5.00% | | |
| CCZU-3-F | 13.00% | | |
| CCZU-4-F | 5.00% | | |
| CCZU-5-F | 5.00% | | |
| CH-33 | 4.00% | | |
| CH-35 | 3.00% | | |
| CH-43 | 3.00% | | |
| CH-45 | 3.00% | | |

Example 39

| | | | |
|---|---|---|---|
| CCH-301 | 13.00% | S → N | <−20° C. |
| CCH-35 | 6.00% | Clearing point: | +87.0° C. |
| CCH-3CF$_3$ | 8.00% | Δn [589 nm, 20° C.]: | +0.0623 |
| CCP-2F.F.F | 10.00% | d · Δn [20° C., μm]: | 0.50 |
| CCP-3F.F.F | 14.00% | Twist [°]: | 90 |
| CCP-5F.F.F | 6.00% | V$_{10}$ [V]: | 1.62 |
| CCP-4CF$_3$.F.F | 6.00% | | |
| CCZU-2-F | 5.00% | | |
| CCZU-3-F | 7.00% | | |
| CCZU-4-F | 5.00% | | |
| CCZU-5-F | 5.00% | | |
| CH-33 | 4.00% | | |

-continued

| | | | | |
|---|---|---|---|---|
| CH-35 | 4.00% | | | |
| CH-43 | 3.00% | | | |
| CH-45 | 4.00% | | | |

Example 40

| | | | | |
|---|---|---|---|---|
| CCH-301 | 15.00% | Clearing point: | +85.5° C. |
| CCH-3CF$_3$ | 8.00% | Δn [589 nm, 20° C.]: | +0.0612 |
| CC-5-OMT | 6.00% | d · Δn [20° C., μm]: | 0.50 |
| CCP-2F.F.F | 10.00% | Twist [°]: | 90 |
| CCP-3F.F.F | 14.00% | V$_{10}$ [V]: | 1.59 |
| CCP-5F.F.F | 6.00% | | |
| CCZU-2-F | 5.00% | | |
| CCZU-3-F | 13.00% | | |
| CCZU-5-F | 6.00% | | |
| CH-33 | 5.00% | | |
| CH-35 | 4.00% | | |
| CH-43 | 4.00% | | |
| CH-45 | 4.00% | | |

Example 41

| | | | | |
|---|---|---|---|---|
| CCH-301 | 17.00% | Clearing point: | +89.5° C. |
| CCH-35 | 6.00% | Δn [589 nm, 20° C.]: | +0.0617 |
| CCH-3CF$_3$ | 8.00% | | |
| CCP-2F.F.F | 5.00% | | |
| CCP-3F.F.F | 5.00% | | |
| CCP-5F.F.F | 5.00% | | |
| CCZU-2-F | 5.00% | | |
| CCZU-3-F | 13.00% | | |
| CCZU-4-F | 5.00% | | |
| CCZU-5-F | 5.00% | | |
| CCZG-2-OT | 5.00% | | |
| CCZG-3-OT | 5.00% | | |
| CCZG-5-OT | 5.00% | | |
| CH-33 | 3.00% | | |
| CH-35 | 3.00% | | |
| CH-43 | 3.00% | | |
| CH-45 | 2.00% | | |

Example 42

| | | | | |
|---|---|---|---|---|
| CCH-301 | 14.00% | Clearing point: | +85.5° C. |
| CCH-35 | 11.00% | Δn [589 nm, 20° C.]: | +0.0601 |
| CCH-3CF$_3$ | 8.00% | | |
| CCP-2F.F.F | 5.00% | | |
| CCP-3F.F.F | 10.00% | | |
| CCP-5F.F.F | 6.00% | | |
| CCZU-2-F | 5.00% | | |
| CCZU-3-F | 18.00% | | |
| CCZU-4-F | 8.00% | | |
| CCZU-5-F | 5.00% | | |
| CH-33 | 3.00% | | |
| CH-35 | 3.00% | | |
| CH-43 | 2.00% | | |
| CH-45 | 2.00% | | |

Example 43

| | | | | |
|---|---|---|---|---|
| CCH-301 | 15.00% | Clearing point: | +86.0° C. |
| CCH-35 | 10.00% | Δn [589 nm, 20° C.]: | +0.0605 |
| CCH-3CF$_3$ | 8.00% | d · Δn [20° C., μm]: | 0.50 |
| CCP-2F.F.F | 7.00% | Twist [°]: | 90 |
| CCP-3F.F.F | 13.00% | V$_{10}$ [V]: | 1.70 |
| CCP-5F.F.F. | 6.00% | | |
| CCZU-2-F | 5.00% | | |
| CCZU-3-F | 13.00% | | |
| CCZU-4-F | 5.00% | | |
| CCZU-5-F | 5.00% | | |
| CH-33 | 4.00% | | |
| CH-35 | 3.00% | | |
| CH-43 | 3.00% | | |
| CH-45 | 3.00% | | |

Example 44

| | | | | |
|---|---|---|---|---|
| CCH-301 | 13.00% | Clearing point: | +86.0° C. |
| CCH-35 | 6.00% | Δn [589 nm, 20° C.]: | +0.0615 |
| CCH-3CF$_3$ | 8.00% | d · Δn [20° C., μm]: | 0.50 |
| CCP-2F.F.F | 13.00% | Twist [°]: | 90 |
| CCP-3F.F.F | 17.00% | V$_{10}$ [V]: | 1.67 |
| CCP-5F.F.F | 8.00% | | |
| CCZU-2-F | 5.00% | | |
| CCZU-3-F | 10.00% | | |
| CCZU-5-F | 5.00% | | |

-continued

| | | | | |
|---|---|---|---|---|
| CH-33 | 4.00% | | | |
| CH-35 | 4.00% | | | |
| CH-43 | 3.00% | | | |
| CH-45 | 4.00% | | | |

Example 45

| | | | | |
|---|---|---|---|---|
| CCH-301 | 12.00% | Clearing point: | +84.0° C. |
| CCH-35 | 10.00% | Δn [589 nm, 20° C.]: | +0.0602 |
| CCH-3CF$_3$ | 11.00% | d · Δn [20° C., μm]: | 0.50 |
| CCP-2F.F.F | 9.00% | Twist [°]: | 90 |
| CCP-3F.F.F | 12.00% | V$_{10}$ [V]: | 1.66 |
| CCP-5F.F.F | 5.00% | | |
| CCZU-2-F | 5.00% | | |
| CCZU-3-F | 13.00% | | |
| CCZU-4-F | 5.00% | | |
| CCZU-5-F | 5.00% | | |
| CH-33 | 4.00% | | |
| CH-35 | 3.00% | | |
| CH-43 | 3.00% | | |
| CH-45 | 3.00% | | |

Example 46

| | | | | |
|---|---|---|---|---|
| CCH-301 | 17.00% | Clearing point: | +73.5° C. |
| CCH-35 | 10.00% | Δn [589 nm, 20° C.]: | +0.0585 |
| CCH-3CF$_3$ | 11.00% | d · Δn [20° C., μm]: | 0.50 |
| CCP-2F.F.F | 9.00% | Twist [°]: | 90 |
| CCP-3F.F.F | 12.00% | V$_{10}$ [V]: | 1.59 |
| CCP-5F.F.F | 5.00% | | |
| CCZU-2-F | 5.00% | | |
| CCZU-3-F | 13.00% | | |
| CCZU-4-F | 5.00% | | |
| CCZU-5-F | 5.00% | | |
| CH-33 | 3.00% | | |
| CH-35 | 3.00% | | |
| CH-43 | 2.00% | | |

Example 47

| | | | | |
|---|---|---|---|---|
| CCH-301 | 14.00% | S → N | <−40° C. |
| CCH-34 | 4.00% | Clearing point: | +78.0° C. |
| CC-5-V | 5.00% | Δn [589 nm, 20° C.]: | +0.0601 |
| CCP-2F.F.F | 10.00% | Δε [kHz, 20° C.]: | 6.6 |
| CCP-3F.F.F | 12.00% | d · Δn [20° C., μm]: | 0.50 |
| CCP-5F.F.F | 6.00% | Twist [°]: | 90 |
| CCZU-2-F | 5.00% | V$_{10}$ [V]: | 1.62 |
| CCZU-3-F | 16.00% | | |
| CCZU-5-F | 5.00% | | |
| CCP-20CF$_3$.F | 2.00% | | |
| CCH-3CF$_3$ | 10.00% | | |
| CH-33 | 3.00% | | |
| CH-35 | 3.00% | | |
| CH-43 | 3.00% | | |
| CH-45 | 2.00% | | |

Example 48

| | | | | |
|---|---|---|---|---|
| CCH-301 | 12.00% | Clearing point: | +85.0° C. |
| CCH-35 | 10.00% | Δn [589 nm, 20° C.]: | +0.0602 |
| CCH-3CF$_3$ | 6.00% | d · Δn [20° C., μm]: | 0.50 |
| CCH-5CF$_3$ | 5.00% | Twist [°]: | 90 |
| CCP-2F.F.F | 9.00% | V$_{10}$ [V]: | 1.72 |
| CCP-3F.F.F | 12.00% | | |
| CCP-5F.F.F | 5.00% | | |
| CCZU-2-F | 5.00% | | |
| CCZU-3-F | 13.00% | | |
| CCZU-4-F | 5.00% | | |
| CCZU-5-F | 5.00% | | |
| CH-33 | 4.00% | | |
| CH-35 | 3.00% | | |
| CH-43 | 3.00% | | |
| CH-45 | 3.00% | | |

Example 49

| | | | | |
|---|---|---|---|---|
| CCH-301 | 8.00% | Clearing point: | +83.5° C. |
| CCH-501 | 5.00% | Δn [589 nm, 20° C.]: | +0.0603 |
| CCH-35 | 7.00% | Δε [kHz, 20° C.]: | +7.3 |
| CC-5-V | 3.00% | d · Δn [20° C., μm]: | 0.50 |
| CCH-3CF$_3$ | 6.00% | Twist [°]: | 90 |
| CCH-5CF$_3$ | 5.00% | V$_{10}$ [V]: | 1.72 |
| CCP-2F.F.F | 7.00% | | |
| CCP-3F.F.F | 8.00% | | |
| CCP-4F.F.F | 6.00% | | |

-continued

| | |
|---|---|
| CCP-5F.F.F | 5.00% |
| CCZU-2-F | 5.00% |
| CCZU-3-F | 8.00% |
| CCZU-4-F | 5.00% |
| CCZU-5-F | 5.00% |
| CCZG-2-OT | 5.00% |
| CH-33 | 3.00% |
| CH-35 | 3.00% |
| CH-43 | 3.00% |
| CH-45 | 3.00% |

Example 50

| | | | |
|---|---|---|---|
| CCH-301 | 5.00% | S → N | <−30° C. |
| CH-33 | 3.00% | Clearing point: | +68.0° C. |
| CH-35 | 3.00% | $\Delta n$ [589 nm, 20° C.]: | +0.0602 |
| CCP-2F.F.F | 6.00% | $\Delta \epsilon$ [kHz; 20° C.]: | +10.3 |
| CCZU-2-F | 6.00% | $\gamma_1$ [mPa · s, 20° C.]: | 161 |
| CCZU-3-F | 16.00% | d · $\Delta n$ [20° C., μm]: | 0.50 |
| CCZU-5-F | 6.00% | Twist [°]: | 90 |
| CDU-2-F | 10.00% | $V_{10}$ [V]: | 1.22 |
| CDU-3-F | 12.00% | | |
| CDU-5-F | 8.00% | | |
| CCH-3CF$_3$ | 9.00% | | |
| CCH-5CF$_3$ | 12.00% | | |
| CCPC-34 | 4.00% | | |

Example 51

| | | | |
|---|---|---|---|
| CH-33 | 4.00% | Clearing point: | +74.0° C. |
| CCP-2F.F.F | 10.00% | $\Delta n$ [589 nm, 20° C.]: | +0.0631 |
| CCP-3F.F.F | 2.00% | d · $\Delta n$ [20° C., μm]: | 0.50 |
| CCZU-2-F | 6.00% | Twist [°]: | 90 |
| CCZU-3-F | 16.00% | $V_{10}$ [V]: | 1.21 |
| CCZU-5-F | 6.00% | | |
| CDU-2-F | 10.00% | | |
| CDU-3-F | 12.00% | | |
| CDU-5-F | 8.00% | | |
| CCH-3CF$_3$ | 9.00% | | |
| CCH-5CF$_3$ | 12.00% | | |
| CCPC-33 | 2.00% | | |
| CCPC-34 | 3.00% | | |

Example 52

| | | | |
|---|---|---|---|
| CH-33 | 4.00% | Clearing point: | +69.0° C. |
| CCP-2F.F.F | 10.00% | $\Delta n$ [589 nm, 20° C.]: | +0.0625 |
| CCP-3F.F.F | 4.00% | d · $\Delta n$ [20° C., μm]: | 0.50 |
| CCZU-2-F | 6.00% | Twist [°]: | 90 |
| CCZU-3-F | 16.00% | $V_{10}$ [V]: | 1.16 |
| CCZU-5-F | 6.00% | | |
| CDU-2-F | 9.00% | | |
| CDU-3-F | 11.00% | | |
| CDU-5-F | 7.00% | | |
| CCH-3CF$_3$ | 10.00% | | |
| CCH-5CF$_3$ | 12.00% | | |
| CCPC-33 | 2.00% | | |
| CCPC-34 | 3.00% | | |

Example 53

| | | | |
|---|---|---|---|
| CCH-34 | 6.00% | S → N | <−40° C. |
| CCH-3CF$_3$ | 3.00% | Clearing point: | +75.0° C. |
| CCH-5CF$_3$ | 8.00% | $\Delta n$ [589 nm, 20° C.]: | +0.0644 |
| CCP-2F.F.F | 11.00% | $\Delta \epsilon$ [kHz, 20° C.]: | +10.1 |
| CCP-3F.F.F | 10.00% | d · $\Delta n$ [20° C., μm]: | 0.50 |
| CCP-5F.F.F | 6.00% | Twist [°]: | 90 |
| CCP-2OCF$_3$.F | 4.00% | $V_{10}$ [V]: | 1.34 |
| CCP-4OCF$_3$ | 8.00% | | |
| CDU-2-F | 10.00% | | |
| CDU-3-F | 12.00% | | |
| CDU-5-F | 10.00% | | |
| CCOC-3-3 | 4.00% | | |
| CCOC-4-3 | 8.00% | | |

Example 54

| | | | |
|---|---|---|---|
| CCH-34 | 5.00% | Clearing point: | +80.0° C. |
| CC-5-V | 8.00% | $\Delta n$ [589 nm, 20° C.]: | +0.0642 |
| CCH-3CF$_3$ | 6.00% | $\Delta \epsilon$ [kHz, 20° C.]: | +7.8 |
| CCH-5CF$_3$ | 8.00% | d · $\Delta n$ [20° C., μm]: | 0.50 |
| CCP-2F.F.F | 11.00% | Twist [°]: | 90 |
| CCP-3F.F.F | 11.00% | $V_{10}$ [V]: | 1.58 |
| CCP-5F.F.F | 6.00% | | |
| CCZU-2-F | 6.00% | | |
| CCZU-3-F | 14.00% | | |
| CCZU-5-F | 6.00% | | |
| CCP-2OCF$_3$.F | 8.00% | | |
| CCP-4OCF$_3$ | 4.00% | | |
| CCOC-4-3 | 5.00% | | |
| CCOC-3-3 | 2.00% | | |

Example 55

| | | | |
|---|---|---|---|
| CCH-34 | 5.00% | S → N | <−40° C. |
| CC-5-V | 8.00% | Clearing point: | +80.5° C. |
| CCH-3CF$_3$ | 6.00% | $\Delta n$ [589 nm, 20° C.]: | +0.0643 |
| CCH-5CF$_3$ | 8.00% | $\Delta \epsilon$ [kHz, 20° C.]: | +7.8 |
| CCP-2F.F.F | 11.00% | d · $\Delta n$ [20° C., μm]: | 0.50 |
| CCP-3F.F.F | 11.00% | Twist [°]: | 90 |
| CCP-5F.F.F | 6.00% | $V_{10}$ [V]: | 1.59 |
| CCZU-2-F | 5.00% | | |
| CCZU-3-F | 15.00% | | |
| CCZU-5-F | 5.00% | | |
| CCP-2OCF$_3$.F | 8.00% | | |
| CCP-4OCF$_3$ | 5.00% | | |
| CCOC-4-3 | 5.00% | | |
| CCOC-3-3 | 2.00% | | |

Example 56

| | | | |
|---|---|---|---|
| CCH-34 | 5.00% | S → N | <−40° C. |
| CC-5-V | 6.00% | Clearing point: | +80.0° C. |
| CCH-3CF$_3$ | 6.00% | $\Delta n$ [589 nm, 20° C.]: | +0.0648 |
| CCH-5CF$_3$ | 6.00% | $\Delta \epsilon$ [kHz, 20° C.,]: | +8.0 |
| CCP-2F.F.F | 12.00% | d · $\Delta n$ [20° C., μm]: | 0.50 |
| CCP-3F.F.F | 11.00% | Twist [°]: | 90 |
| CCP-5F.F.F | 6.00% | $V_{10}$ [V]: | 1.54 |
| CCP-2OCF$_3$.F | 8.00% | | |
| CCP-5OCF$_3$.F | 8.00% | | |
| CCP-4OCF$_3$ | 6.00% | | |
| CDU-2-F | 6.00% | | |
| CDU-3-F | 8.00% | | |
| CCOC-3-3 | 4.00% | | |
| CCOC-4-3 | 8.00% | | |

Example 57

| | | | |
|---|---|---|---|
| CCH-34 | 5.00% | S → N | <−40° C. |
| CC-5-V | 6.00% | Clearing point: | +80.5° C. |
| CCH-3CF$_3$ | 6.00% | $\Delta \epsilon$ [kHz, 20° C.]: | +7.9 |
| CCH-5CF$_3$ | 8.00% | $\gamma_1$ [mPa · s, 20° C.]: | 124 |
| CCP-2F.F.F | 11.00% | d · $\Delta n$ [20° C., μm]: | 0.50 |
| CCP-3F.F.F | 12.00% | Twist [°]: | 90 |
| CCP-5F.F.F | 5.00% | $V_{10}$ [V]: | 1.56 |
| CCZU-2-F | 5.00% | | |
| CCZU-3-F | 15.00% | | |
| CCZU-5-F | 4.00% | | |
| CCP-2OCF$_3$.F | 10.50% | | |
| CCP-4OCF$_3$ | 6.50% | | |
| CCOC-4-3 | 4.00% | | |
| CCOC-3-3 | 2.00% | | |

Example 58

| | | | |
|---|---|---|---|
| CCH-301 | 10.00% | S → N | <−40° C. |
| CCH-501 | 9.00% | Clearing point: | +95.5° C. |
| CCH-35 | 5.00% | $\Delta n$ [589 nm, 20° C.]: | +0.0608 |
| CC-5-V | 12.00% | $V_{10}$ [V]: | 2.32 |
| CC-3-V1 | 5.00% | d · $\Delta n$ [20° C., μm]: | 0.50 |
| CCH-3CF$_3$ | 4.00% | Twist [°]: | 90 |
| CCH-5CF$_3$ | 5.00% | | |
| CCP-2F.F.F | 6.00% | | |
| CDU-2-F | 6.00% | | |
| CDU-3-F | 8.00% | | |
| CCZU-3-F | 7.00% | | |
| CCPC-33 | 4.00% | | |
| CCPC-34 | 5.00% | | |
| CCPC-35 | 4.00% | | |
| CCOC-3-3 | 3.00% | | |
| CCOC-4-3 | 5.00% | | |
| CCOC-3-5 | 2.00% | | |

Example 59

| | | | |
|---|---|---|---|
| CCH-301 | 10.00% | S → N | <−40° C. |
| CCH-501 | 8.00% | Clearing point: | +95.0° C. |
| CCH-35 | 5.00% | $\Delta n$ [589 nm, 20° C.]: | +0.0607 |
| CC-5-V | 15.00% | d · $\Delta n$ [20° C., μm]: | 0.50 |
| CC-3-V1 | 4.00% | Twist [°]: | 90 |

| | | | | |
|---|---|---|---|---|
| CCH-3CF₃ | 4.00% | V₁₀ [V]: | 2.32 | |
| CCH-5CF₃ | 4.00% | | | |
| CCP-2F.F.F | 7.00% | | | |
| CDU-2-F | 7.00% | | | |
| CDU-3-F | 7.00% | | | |
| CCZU-3-F | 6.00% | | | |
| CCPC-33 | 4.00% | | | |
| CCPC-34 | 5.00% | | | |
| CCPC-35 | 4.00% | | | |
| CCOC-3-3 | 3.00% | | | |
| CCOC-4-3 | 5.00% | | | |
| CCOC-3-5 | 2.00% | | | |

Example 60

| | | | |
|---|---|---|---|
| CCH-301 | 10.00% | S → N | <−40° C. |
| CCH-501 | 11.00% | Clearing point: | +95.5° C. |
| CCH-35 | 5.00% | Δn [589 nm, 20° C.]: | +0.0609 |
| CC-5-V | 9.00% | d · Δn [20° C., μm]: | 0.50 |
| CCH-3CF₃ | 4.00% | Twist [°]: | 90 |
| CCH-5CF₃ | 6.00% | V₁₀ [V]: | 2.27 |
| CCP-2F.F.F | 6.00% | | |
| CDU-2-F | 6.00% | | |
| CDU-3-F | 8.00% | | |
| CCZU-3-F | 7.00% | | |
| CCOC-3-3 | 3.00% | | |
| CCOC-4-3 | 5.00% | | |
| CCOC-3-5 | 2.00% | | |
| CCGC-3-3 | 2.00% | | |
| CCGC-3-5 | 3.00% | | |
| CGCC-2-3 | 5.00% | | |
| CGCC-2-5 | 5.00% | | |
| CH-43 | 3.00% | | |

Example 61

| | | | |
|---|---|---|---|
| CCH-35 | 5.00% | Clearing point: | +95.0° C. |
| CC-3-V1 | 10.00% | Δn [589 nm, 20° C.]: | +0.0641 |
| CC-5-V | 18.00% | V₁₀ [V]: | 2.34 |
| CCH-3CF₃ | 8.00% | d · Δn [20° C., μm]: | 0.50 |
| CCH-5CF₃ | 10.00% | Twist [°]: | 90 |
| CCP-2F.F.F | 6.00% | | |
| CDU-2-F | 8.00% | | |
| CDU-3-F | 10.00% | | |
| CGCC-2-3 | 5.00% | | |
| CGCC-2-5 | 4.00% | | |
| CCGC-3-2 | 5.00% | | |
| CCGC-3-5 | 3.00% | | |
| CCOC-3-3 | 3.00% | | |
| CCOC-4-3 | 5.00% | | |

Example 62

| | | | |
|---|---|---|---|
| CCH-301 | 9.00% | S → N | <−40° C. |
| CCH-501 | 10.00% | Clearing point: | +96.0° C. |
| CCH-35 | 5.00% | Δn [589 nm, 20° C.]: | +0.0615 |
| CC-5-V | 9.00% | V₁₀ [V]: | 2.25 |
| CCH-3CF₃ | 3.00% | d · Δn [20° C., μm]: | 0.50 |
| CCH-5CF₃ | 8.00% | Twist [°]: | 90 |
| CCP-2F.F.F | 8.00% | | |
| CDU-2-F | 8.00% | | |
| CDU-3-F | 10.00% | | |
| CCOC-3-3 | 3.00% | | |
| CCOC-4-3 | 5.00% | | |
| CCOC-3-5 | 2.00% | | |
| CCGC-3-2 | 4.00% | | |
| CCGC-3-5 | 3.00% | | |
| CGCC-2-3 | 5.00% | | |
| CGCC-2-5 | 5.00% | | |
| CH-43 | 3.00% | | |

Example 63

| | | | |
|---|---|---|---|
| CCH-301 | 9.00% | S → N | <−40° C. |
| CCH-501 | 9.00% | Clearing point: | +95.0° C. |
| CCH-35 | 5.00% | Δn [589 nm, 20° C.]: | +0.0608 |
| CC-5-V | 14.00% | V₁₀ [V]: | 2.26 |
| CC-3-V1 | 3.00% | d · Δn [20° C., μm]: | 0.50 |
| CCH-3CF₃ | 4.00% | Twist [°]: | 90 |
| CCH-5CF₃ | 5.00% | | |
| CCP-2F.F.F | 5.00% | | |
| CDU-2-F | 6.00% | | |
| CDU-3-F | 7.00% | | |
| CCZU-3-F | 8.50% | | |
| CCZU-5-F | 3.00% | | |
| CCPC-33 | 4.00% | | |
| CCPC-34 | 4.00% | | |
| CCPC-35 | 4.00% | | |
| CCOC-3-3 | 3.00% | | |
| CCOC-4-3 | 4.50% | | |
| CCOC-3-5 | 2.00% | | |

Example 64

| | | | |
|---|---|---|---|
| CCH-3CF₃ | 7.00% | Clearing point: | +83.0° C. |
| CCH-5CF₃ | 7.00% | Δn [589 nm, 20° C.]: | +0.0639 |
| CCH-301 | 8.00% | V₁₀ [V]: | 1.38 |
| CCP-2F.F.F | 6.00% | d · Δn [20° C., μm]: | 0.50 |
| CCP-3F.F.F | 6.00% | Twist [°]: | 90 |
| CCP-4F.F.F | 5.00% | | |
| CCP-5F.F.F | 6.00% | | |
| CCZU-2-F | 8.00% | | |
| CCZU-3-F | 10.00% | | |
| CCZU-4-F | 9.00% | | |
| CCZU-5-F | 8.00% | | |
| CCZG-3-OT | 5.00% | | |
| CCZG-5-OT | 5.00% | | |
| CCZG-2-OT | 5.00% | | |
| CH-33 | 3.00% | | |
| CH-35 | 2.00% | | |

Example 65

| | | | |
|---|---|---|---|
| CCH-3CF₃ | 4.00% | Clearing point: | +80.5° C. |
| CCH-5CF₃ | 4.00% | Δn [589 nm, 20° C.]: | +0.0641 |
| CCH-301 | 10.00% | V₁₀ [V]: | 1.39 |
| CCH-501 | 10.00% | d · Δn [20° C., μm]: | 0.50 |
| CCP-2F.F.F | 9.00% | Twist [°]: | 90 |
| CCP-3F.F.F | 6.00% | | |
| CCZU-3-F | 15.00% | | |
| CCZU-5-F | 6.00% | | |
| CDU-2-F | 10.00% | | |
| CDU-3-F | 9.00% | | |
| CDU-5-F | 7.00% | | |
| CCPC-33 | 5.00% | | |
| CCPC-35 | 5.00% | | |

Example 66

| | | | |
|---|---|---|---|
| CCH-3CF₃ | 4.00% | Clearing point: | +75.0° C. |
| CCH-5CF₃ | 4.00% | Δn [589 nm, 20° C.]: | +0.0633 |
| CCH-301 | 10.00% | V₁₀ [V]: | 1.34 |
| CCH-501 | 10.00% | d · Δn [20° C., μm]: | 0.50 |
| CCP-2F.F.F | 9.00% | Twist [°]: | 90 |
| CCP-3F.F.F | 6.00% | | |
| CCZU-3-F | 15.00% | | |
| CCZU-5-F | 6.00% | | |
| CDU-2-F | 10.00% | | |
| CDU-3-F | 9.00% | | |
| CDU-5-F | 7.00% | | |
| CPCC-2-2 | 5.00% | | |
| CPCC-2-3 | 5.00% | | |

Example 67

| | | | |
|---|---|---|---|
| CCH-301 | 4.00% | S → N | <−40° C. |
| CCH-501 | 5.50% | Clearing point: | +88.0° C. |
| CCP-2F.F.F | 10.00% | Δn [589 nm, 20° C.]: | +0.0650 |
| CCP-3F.F.F | 12.00% | Δε [kHz, 20° C.]: | +8.2 |
| CCP-5F.F.F | 5.00% | d · Δn [20° C., μm]: | 0.50 |
| CCZU-2-F | 4.00% | Twist [°]: | 90 |
| CCZU-3-F | 17.00% | V₁₀ [V]: | 1.52 |
| CCZU-5-F | 4.00% | | |
| CCP-20CF₂.F.F | 3.00% | | |
| CCP-30CF₂.F.F | 7.00% | | |
| CCP-50CF₂.F.F | 7.00% | | |
| CH-33 | 3.50% | | |
| CH-35 | 3.00% | | |
| CH-43 | 4.00% | | |
| CCH-3CF₃ | 6.00% | | |
| CCH-5CF₃ | 5.00% | | |

Example 68

| | | | |
|---|---|---|---|
| CCH-301 | 12.00% | S → N | <−30° C. |
| CCH-501 | 8.00% | Clearing point: | +80.0° C. |
| CC-5-V | 8.00% | Δn [589 nm, 20° C.]: | +0.0606 |
| CCP-2F.F.F | 10.00% | Δε [kHz, 20° C.]: | +6.3 |
| CCP-3F.F.F | 12.00% | | |

-continued

| | |
|---|---|
| CCP-5F.F.F | 5.00% |
| CCZU-2-F | 5.00% |
| CCzU-3-F | 17.00% |
| CCZU-5-F | 5.00% |
| CH-33 | 3.00% |
| CH-35 | 3.00% |
| CH-43 | 3.00% |
| CCH-3CF$_3$ | 7.00% |
| CCPC-33 | 2.00% |

The invention claimed is:

1. Liquid-crystalline medium comprising a mixture of polar compounds of positive dielectric anisotropy, wherein:
   the medium comprises one or more compounds of formula Ia

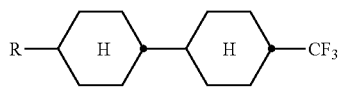

Ia in which
   R is H, an alkyl or alkenyl radical having 1 to 15 carbon atoms which is unsubstituted, monosubstituted by CN or CF$_3$ or at least monosubstituted by halogen, where one or more CH$_2$ groups in these radicals are optionally, in each case independently of one another, replaced by —O—, —S—,

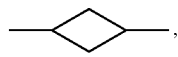

—CO—, —CO—O—, —O—CO— or —O—CO—O in such a way that O atoms are not linked directly to one another, and
the medium further comprises at least one compound of the formula Xc or Xd:

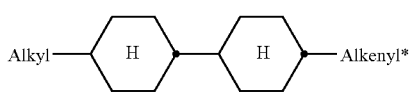

Xc

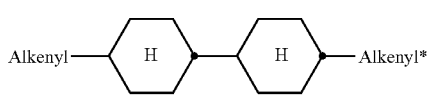

Xd wherein Alkyl is a straight-chain or branched alkyl group of 1–7 carbon atoms, and Alkenyl and Alkenyl* are, independently, a straight-chain or branched alkenyl group of 2–7 carbon atoms.
wherein the medium exhibits a birefringence value of ≦0.065.

2. Medium according to claim 1, which additionally comprises one or more compounds selected from the group consisting of compounds of the formulae II to VIII:

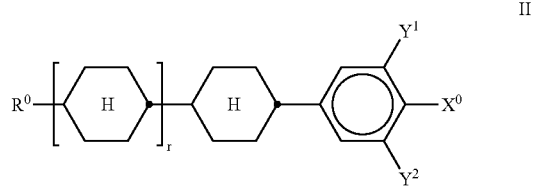

II

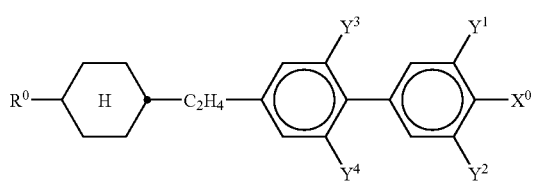

III

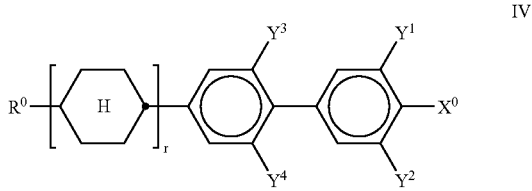

IV

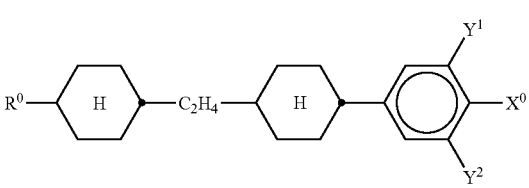

V

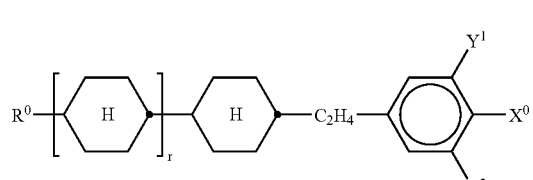

VI

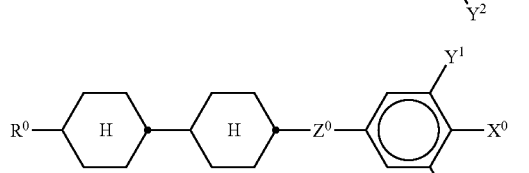

VII

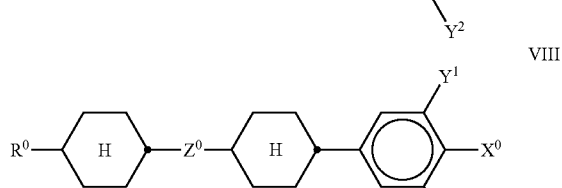

VIII in which the individual radicals have the following meanings:
   R$^0$: n-alkyl, oxoalkyl, fluoroalkyl or alkenyl, in each case having 1 to 7 carbon atoms;
   X$^0$: F, Cl, halogenated alkyl, alkenyl or alkoxy having 1 to 6 carbon atoms;
   Z$^0$: —C$_4$H$_8$—, —CF$_2$O—, —OCF$_2$—, —C$_2$F$_4$—, —CH$_2$O—, —OCH$_2$— or —COO—;
   Y$^1$, Y$^2$, Y$^3$ and Y$^4$: each, independently of one another, H or F, and
   r: 0 or 1.

3. Medium according to claim 2, wherein the proportion of compounds of the formulae Ia and II to VIII in the mixture as a whole is at least 50% by weight.

4. Medium according to claim 1, wherein the proportion of compounds of the formula Ia in the mixture as a whole is from 5 to 50% by weight.

5. Medium according claim 2, wherein the proportion of compounds of the formulae II to VIII in the mixture as a whole is from 20 to 80% by weight.

6. Medium, according to claim 1, which additionally comprises one or more compounds of the formula

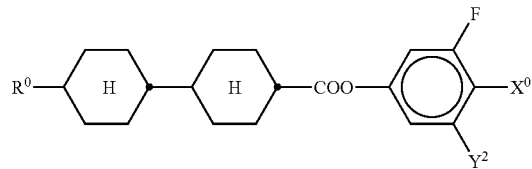

in which
- $R^0$: n-alkyl, oxoalkyl, fluoroalkyl or alkenyl, in each case having 1 to 7 carbon atoms;
- $X^0$: F, Cl, halogenated alkyl, alkenyl or alkoxy having 1 to 6 carbon atoms and;
- $Y^2$: H or F, and
- 0 or 1.

7. Medium according to claim 2, wherein the medium comprises at least one compound of formulae II to VIII, wherein $X^0$ is F or $OCF_3$, and $Y^2$ is H or F.

8. Medium according to claim 1, wherein the medium further comprises at least one compound selected from the group consisting of the compounds of formulae Ib to In:

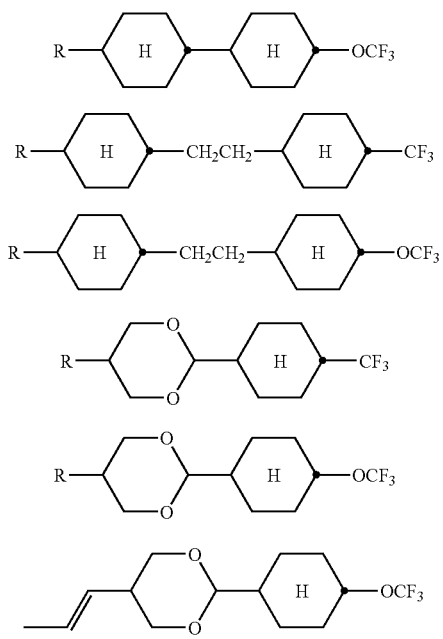

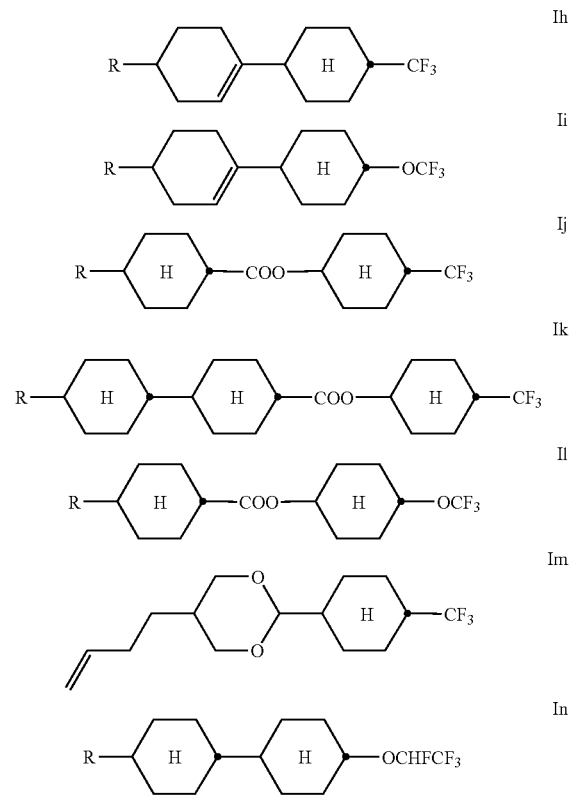

in which R is as defined in claim 1.

9. Electro-optical liquid-crystal display containing a liquid-crystalline medium according to claim 1.

10. Medium according to claim 1, wherein the medium retains a nematic phase down to −20° C. or less, and has a clearing point above 80° C.

11. Medium according to claim 1, wherein the medium retains a nematic phase down to −30° C. or less, and has a clearing point above 90° C.

12. Medium according to claim 1, wherein the medium has a TN threshold below 1.9 V.

13. Medium according to claim 1, wherein the medium has a TN threshold below 1.7 V.

14. Medium according to claim 8, wherein the medium comprises one or more compounds of each of the formulae Ib and Ie.

15. Medium according to claim 8, wherein the medium comprises one or more compounds of each of the formulae Ij and Ik.

16. Medium according to claim 2, wherein the medium comprises at least one compound of the formula IV wherein r is 1, $Y^1$, $Y^2$ and $Y^3$ is F and $Y^4$ is H.

* * * * *

UNITED STATES PATENT AND TRADEMARK OFFICE
CERTIFICATE OF CORRECTION

PATENT NO. : 7,033,654 B2
APPLICATION NO. : 10/882309
DATED : April 25, 2006
INVENTOR(S) : Heckmeier et al.

It is certified that error appears in the above-identified patent and that said Letters Patent is hereby corrected as shown below:

Column 47, line 26, reads "6 carbon atoms and;" should read -- 6 carbon atoms; and --
Column 47, line 27, reads "H or F, and" should read -- H or F --
Column 47, line 28, delete "0 or 1."

Signed and Sealed this

Fourth Day of March, 2008

JON W. DUDAS
*Director of the United States Patent and Trademark Office*